(12) United States Patent
Nishii

(10) Patent No.: US 11,985,276 B2
(45) Date of Patent: May 14, 2024

(54) IMAGE PROCESSING APPARATUS COMPRISING PROCESSING DEVICE THAT ACQUIRES MANAGEMENT INFORMATION FROM TERMINAL DEVICE AND CANCELS RESTRICTION SETTING ON TRANSMISSION AND RECEPTION OF INFORMATION, AND PROCESSING METHOD

(71) Applicant: SHARP KABUSHIKI KAISHA, Sakai (JP)

(72) Inventor: Yuichi Nishii, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/986,921

(22) Filed: Nov. 15, 2022

(65) Prior Publication Data

US 2023/0156129 A1     May 18, 2023

(30) Foreign Application Priority Data

Nov. 18, 2021    (JP) ................................ 2021-188222

(51) Int. Cl.
*H04N 1/00*        (2006.01)
*H04B 1/40*        (2015.01)
*H04N 1/32*        (2006.01)

(52) U.S. Cl.
CPC .......... *H04N 1/00307* (2013.01); *H04B 1/40* (2013.01); *H04N 1/0001* (2013.01); *H04N 1/32096* (2013.01); *H04N 1/32662* (2013.01)

(58) Field of Classification Search
None
See application file for complete search history.

(56) References Cited

U.S. PATENT DOCUMENTS

| 9,430,632 | B2 * | 8/2016 | Ren | G06F 21/35 |
| 2006/0232811 | A1 * | 10/2006 | Yokoyama | G06K 15/02 |
| | | | | 358/1.14 |
| 2018/0027140 | A1 * | 1/2018 | Ikeda | H04N 1/00992 |
| | | | | 358/1.14 |
| 2018/0164728 | A1 * | 6/2018 | Mandachi | G03G 21/203 |
| 2019/0286393 | A1 * | 9/2019 | Sato | H04N 1/4413 |
| 2020/0412886 | A1 * | 12/2020 | Saito | H04L 51/08 |

FOREIGN PATENT DOCUMENTS

JP     2006-135865 A     5/2006

\* cited by examiner

*Primary Examiner* — Haris Sabah
(74) *Attorney, Agent, or Firm* — ScienBiziP, P.C.

(57) ABSTRACT

A processing device includes a communicator that transmits and receives information by using management information, and a controller that restricts the transmission and reception of information via the communicator based on a restriction setting. When the management information is management information acquired from a terminal device, the controller cancels the restriction setting and transmits and receives information via the communicator.

7 Claims, 27 Drawing Sheets

FIG. 17

| USER AUTHORITY MANAGEMENT TABLE | | | |
|---|---|---|---|
| USER NAME | FAX MODE | E-MAIL MODE | ... |
| aaa (ADMINISTRATOR) | Yes | Yes | ... |
| bbb | Yes | Yes | ... |
| ccc | No | Yes | ... |
| ddd | No | No | ... |
| ... | ... | ... | ... |

IMAGE PROCESSING APPARATUS COMPRISING PROCESSING DEVICE THAT ACQUIRES MANAGEMENT INFORMATION FROM TERMINAL DEVICE AND CANCELS RESTRICTION SETTING ON TRANSMISSION AND RECEPTION OF INFORMATION, AND PROCESSING METHOD

BACKGROUND OF THE INVENTION

Field of the Invention

The present disclosure relates to a processing device and the like.

Description of the Background Art

There are known image processing apparatuses such as multifunction peripherals that have, for example, a fax mode that allows image data generated through reading by a scanner device to be faxed and an e-mail mode that allows image data to be attached to e-mail and transmitted.

In sending faxes or e-mails, users can specify the transmission destination from destination information managed by an image processing apparatus to execute a job pertaining to a fax mode or an e-mail mode. The destination information according to the present disclosure refers to information for specifying the destination of communication, such as a telephone number, an e-mail address, a fax number, account information, an address, a place of employment, and the like. The image processing apparatus can accumulate destination information for each communication destination and manage the destination information in the form of an address book. In the present disclosure, the destination information managed internally by the image processing apparatus and the address book that is a collection of the destination information are collectively referred to as internal address information.

When desired destination information is not included in the internal address information managed by the image processing apparatus, or the image processing apparatus installed in convenience stores, copy service providers, or the like is temporarily used to execute the job, it is recently practiced that the destination information (hereinafter referred to external address information) managed by a mobile terminal device such as a smartphone, a tablet, or a mobile phone is temporarily forwarded to the image processing apparatus. Users can perform jobs such as e-mails and faxes by specifying the destination by using the destination information forwarded to the image processing apparatus.

For such an image processing apparatus according to the conventional technique, for example, there is known as a multifunction system in which, when some kind of instruction is given to the multifunction system from a portable terminal, some kind of information for specifying the portable terminal or some kind of information for specifying an individual using the portable terminal is acquired from the portable terminal, and whether or not to execute the instruction from the portable terminal is determined on the basis of the result of comparison with the information preliminarily stored in the multifunction system.

The technique described in the conventional techniques limits the users who can realize the functions of an image processing apparatus (e.g., sending e-mails or faxes) by using destination information stored in the terminal device, in order to prevent unauthorized use of these functions.

The management of the image processing apparatus exemplified by the conventional technique is performed by an administrator who has administrative authority. In general, image processing apparatuses are managed by different administrators at different installation sites, and the operational system differs depending on the settings of the image processing apparatus and the administrators.

Under such circumstances, for example, an image processing apparatus installed in one location can execute jobs by using a terminal device, but an image processing apparatus installed in another location cannot execute jobs by using a terminal device. This is not only due to the user management settings by the administrator. For example, the execution of jobs is also restricted when some restriction settings are imposed on function settings (system settings), and the convenience of using the terminal device to execute jobs can be significantly impaired.

An object of the present disclosure is to provide a processing device or the like that enables the transmission and reception of information by canceling restrictions on the transmission and reception of information when predetermined conditions are met, even when restrictions are imposed on the basis of function settings or user authority.

SUMMARY OF THE INVENTION

In order to solve the above issues, a processing device according to the present disclosure includes a communicator that transmits and receives information by using management information; and a controller that restricts the transmission and reception of the information via the communicator based on a restriction setting, wherein, when the management information is management information acquired from a terminal device, the controller cancels the restriction setting and transmits and receives the information via the communicator.

Another processing device according to the present disclosure includes a communicator that transmits and receives information by using management information; an authority determiner that determines whether or not authority regarding the transmission and reception of the information is granted to an authenticated user; and a controller that restricts the transmission and reception of information via the communicator, wherein the controller restricts the transmission and reception of the information via the communicator based on a determination result of the authority determiner.

An image processing apparatus according to the present disclosure includes the above-described processing device; and an image processor.

A processing method according to the present disclosure includes transmitting and receiving information by using management information; and restricting the transmission and reception of the information based on a restriction setting, wherein, when the management information is management information acquired from a terminal device, the restriction setting is canceled and the information is transmitted and received.

Here, the management information according to the present disclosure may be destination information managed by a processing device or a terminal device, or may be setting information including destination information related to the execution of a job in each mode, such as a fax mode or an e-mail mode.

The present disclosure can provide a processing device or the like that enables the transmission and reception of information by canceling restrictions on the transmission and reception of information when predetermined conditions are met, even when restrictions are imposed on the basis of function settings or user authority.

BRIEF DESCRIPTION OF THE DRAWINGS

FIG. 17 illustrates a user authority management table.

DESCRIPTION OF THE PREFERRED EMBODIMENTS

Embodiments of the present disclosure will now be described with reference to the accompanying drawings. In the present disclosure, a multifunction peripheral having a copy function, a scan function, a fax function, an e-mail function, and the like is described as an example form of a processing device or an image processing apparatus including the processing device. The embodiments described below are presented as examples for explaining the present disclosure, and therefore the technical scope thereof as recited in the appended claims is not limited by the following description.

1 First Embodiment

In the first embodiment, when destination information as management information is external address information acquired from a terminal device, an imposed restriction setting can be canceled, and transmission and reception of information, such as e-mail transmission, can be performed via a communicator.

1.1 Functional Configuration

1.1.1 Multifunction Peripheral 10

Figure 1:
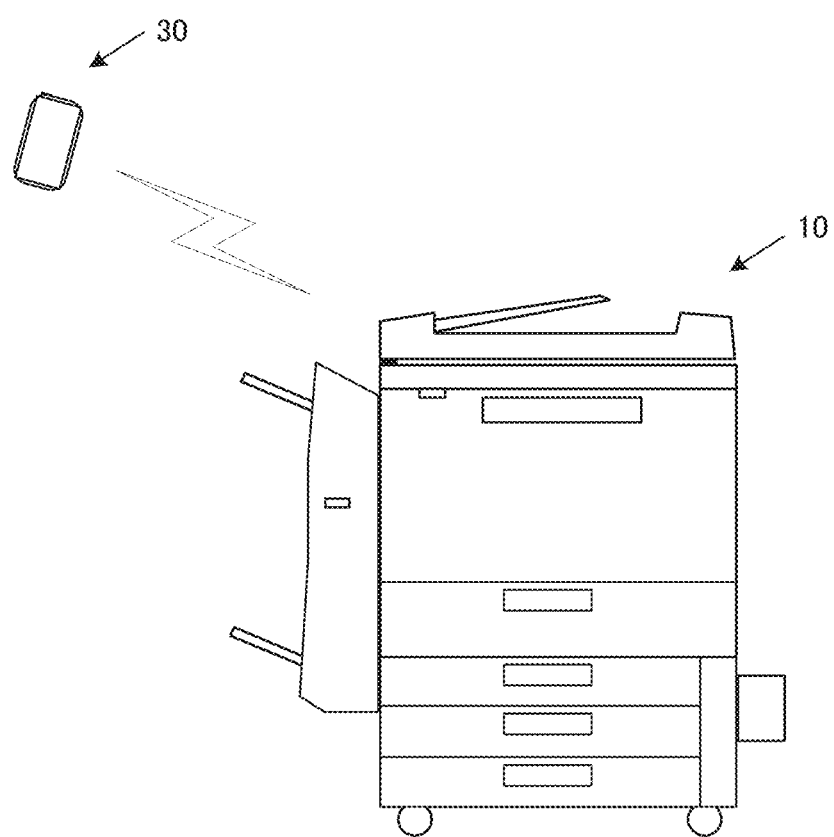
FIG. 1 is a front view diagram illustrating the overall configuration of a multifunction peripheral according to a first embodiment.

FIG. 1 is a front view diagram illustrating the overall configuration of a multifunction peripheral 10 according to the first embodiment. The multifunction peripheral 10 can communicate with a terminal device 30. There is no restriction on the communication methods used, but the near field communication technologies such as Bluetooth (registered trademark), Wi-Fi (registered trademark), Wireless Smart Utility Network (Wi-SUN) (registered trademark), the infrared data association protocols (Irda), or the like can be adopted. In FIG. 1, the multifunction peripheral 10 is illustrated as an example of communicating directly with the terminal device 30, but it is also possible to establish communication via a network not illustrated, such as a local area network (LAN), a wide area network (WAN), or the Internet.

Figure 2:
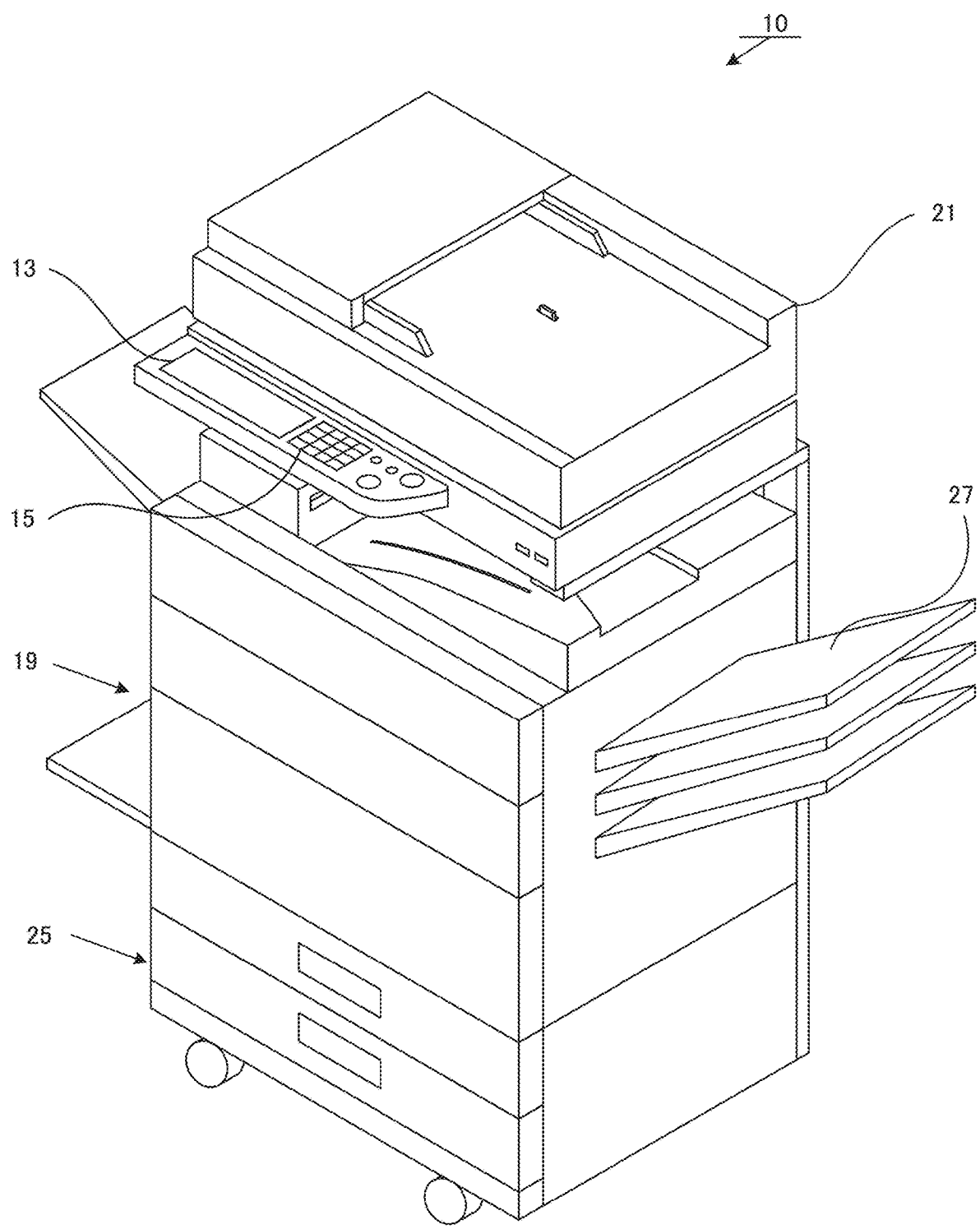
FIG. 2 is a perspective view diagram illustrating the overall configuration of a multifunction peripheral according to a first embodiment.
Figure 3:
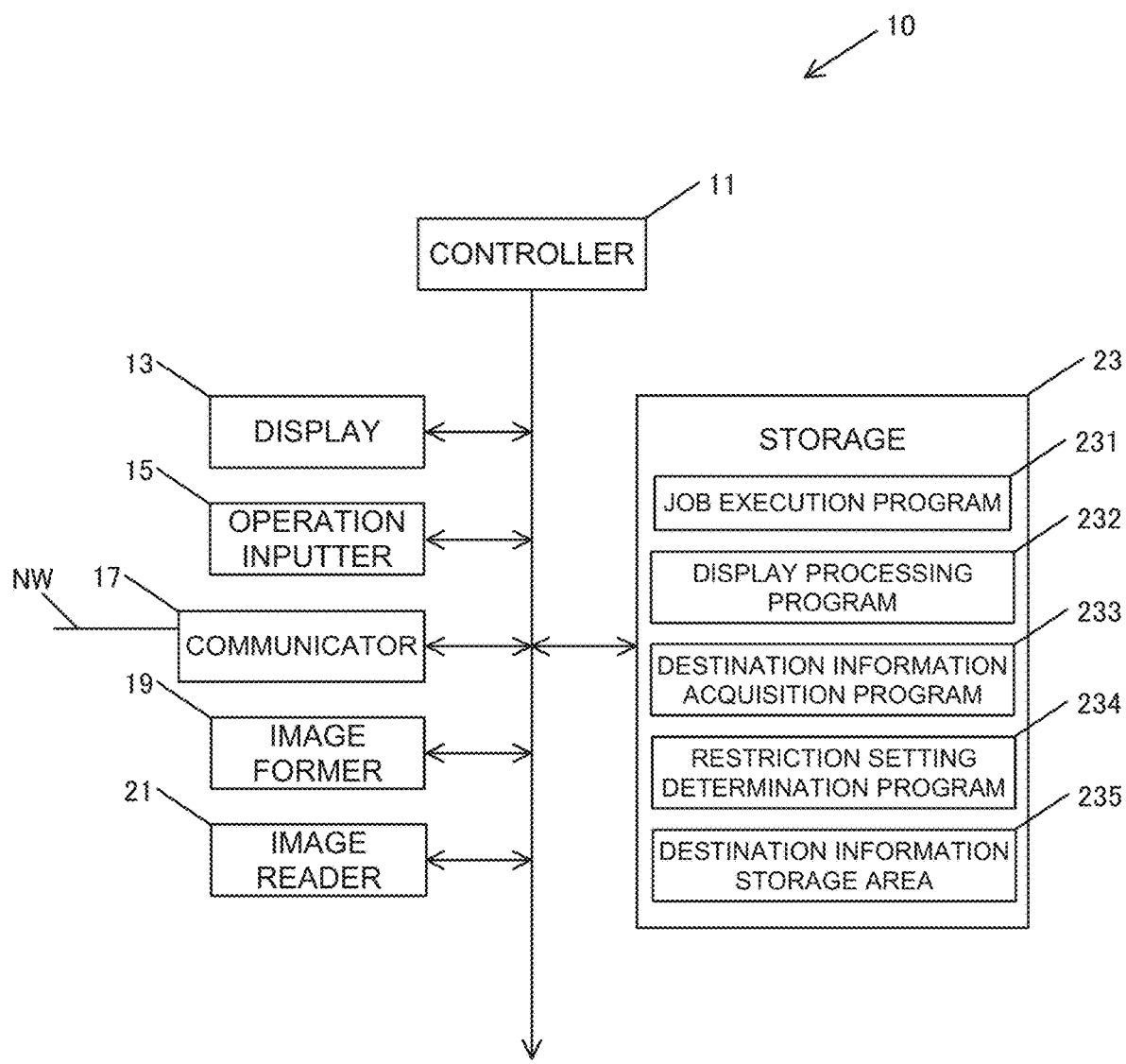
FIG. 3 illustrates the functional configuration of the multifunction peripheral according to the first embodiment.

FIG. 2 is a perspective view diagram illustrating the overall configuration of the multifunction peripheral 10. FIG. 3 illustrates the functional configuration of the multifunction peripheral 10. The multifunction peripheral 10 includes a controller 11, a display 13, an operation inputter 15, a communicator 17, an image former 19, an image reader 21, and a storage 23.

The controller 11 comprehensively controls the multifunction peripheral 10. The controller 11 includes, for example, one or more arithmetic devices (such as central processing units (CPUs)). The controller 11 reads and executes various programs stored in the storage 23, thereby implementing functions.

The display 13 displays various kinds of information to a user, for example. The display 13 may include a liquid crystal display (LCD), an organic electro-luminescence (EL) display, or the like.

The operation inputter 15 accepts input of information by the user or the like. The operation inputter 15 may be provided as hard keys (for example, a numeric keypad), buttons, or the like. The operation inputter 15 may be provided as a touch panel that allows input via the display 13. In such a case, the input on the touch panel may be detected using a resistive film, an infrared light, electromagnetic induction, capacitance, or the like.

The communicator 17 has an interface for the near field communication, as mentioned above, including Bluetooth, Wi-Fi, Wi-SUN, Irda, or the like. The communicator 17 can also have at least one of a wired interface and a wireless interface to communicate with other devices via a network not illustrated, such as LAN, WAN, the Internet, telephone lines, fax lines, or the like.

The image former 19 forms images on sheets, which are recording media, in accordance with image data. The image former 19 feeds a sheet from a sheet feeder 25, forms an image in accordance with image data on the sheet, and then outputs the sheet from a sheet output portion 27. The image former 19 can include, for example, a laser printer using electrophotography. The image former 19 forms images using toner supplied from toner cartridges (not illustrated) corresponding to the toner colors (for example, cyan (C), magenta (M), yellow (Y), and black (K)).

The image reader 21 generates scan data by scanning and reading a target document image. The image reader 21 can be provided as a scanner device including an image sensor such as a charge coupled device (CCD), a contact image sensor (CIS), or the like. The image reader 21 may be any image reader that allows reading of the reflected light image from the document image with the image sensor and generates scan data consisting of red-green-blue (RGB) analog signals.

The storage 23 stores various programs and data necessary for the operation of the multifunction peripheral 10. The storage 23 may include, for example, a storage device such as random access memory (RAM), a hard disk drive (HDD), a solid state drive (SSD), and a read only memory (ROM).

In the first embodiment, the storage 23 stores a job execution program 231, a display processing program 232, a destination information acquisition program 233, and a restriction setting determination program 234, and has a destination information storage area 235.

The job execution program 231 is a program that is read by the controller 11 to perform processing in the copy mode, the scan mode, the fax mode, the e-mail mode, and other modes on a job-by-job basis. The controller 11 reads the job execution program 231 and executes each job by controlling the communicator 17, the image former 19, the image reader 21, and the like.

The display processing program 232 is a program read by the controller 11 in displaying a setting screen that receives input of various setting values, execution instructions, termination instructions, or the like related to execution of a job, an initial screen (for example, a home screen) that displays the setting screen in a switchable manner, an authentication screen for user authentication, an address book screen for displaying the internal address information, external address information, etc., various message screens, or the like.

The destination information acquisition program 233 is a program read by the controller 11 in acquiring the external address information from the terminal device 30. The controller 11, having read the destination information acquisition program 233, controls the communicator 17 and the like to communicate with the terminal device 30 and acquires the destination information managed by the terminal device 30 as the external address information. For example, when using Bluetooth as the communication method, the controller 11 can follow a phone book access profile (PBAP) to collectively acquire the destination information managed by the terminal device 30 in a vCard format.

The restriction setting determination program 234 is a program read by the controller 11 in determining whether or not a restriction setting regarding the transmission and reception of information via the communicator 17 or a restriction setting regarding communication, such as "prohibition of selection from the address book" or "prohibition of direct input (prohibition of direct designation)" is imposed, or whether or not a user is authorized to execute a job, such as fax or e-mail, through the system settings of the multifunction peripheral 10. The controller 11, which has read the restriction setting determination program 234, permits the communicator 17 to execute the function or imposes a restriction on the function execution on the basis of the determination result. The phrase "imposing a restriction" in the present disclosure means that the controller 11 outputs a prohibition command to the communicator 17 so that some or all functions (e.g., sending and receiving information, controlling various interfaces for communication with other devices) that can be implemented by the communicator 17 is prevented from being provided. The communicator 17 that receives a prohibition command is restricted from executing the corresponding function until the restriction is canceled by the controller 11 (i.e., unless a prohibition cancellation order is output).

The destination information storage area 235 is a storage area for storing destination information (external address information) acquired from the terminal device 30 and destination information (internal address information) managed internally by the multifunction peripheral 10.

1.1.2 Terminal Device 30

Figure 4:
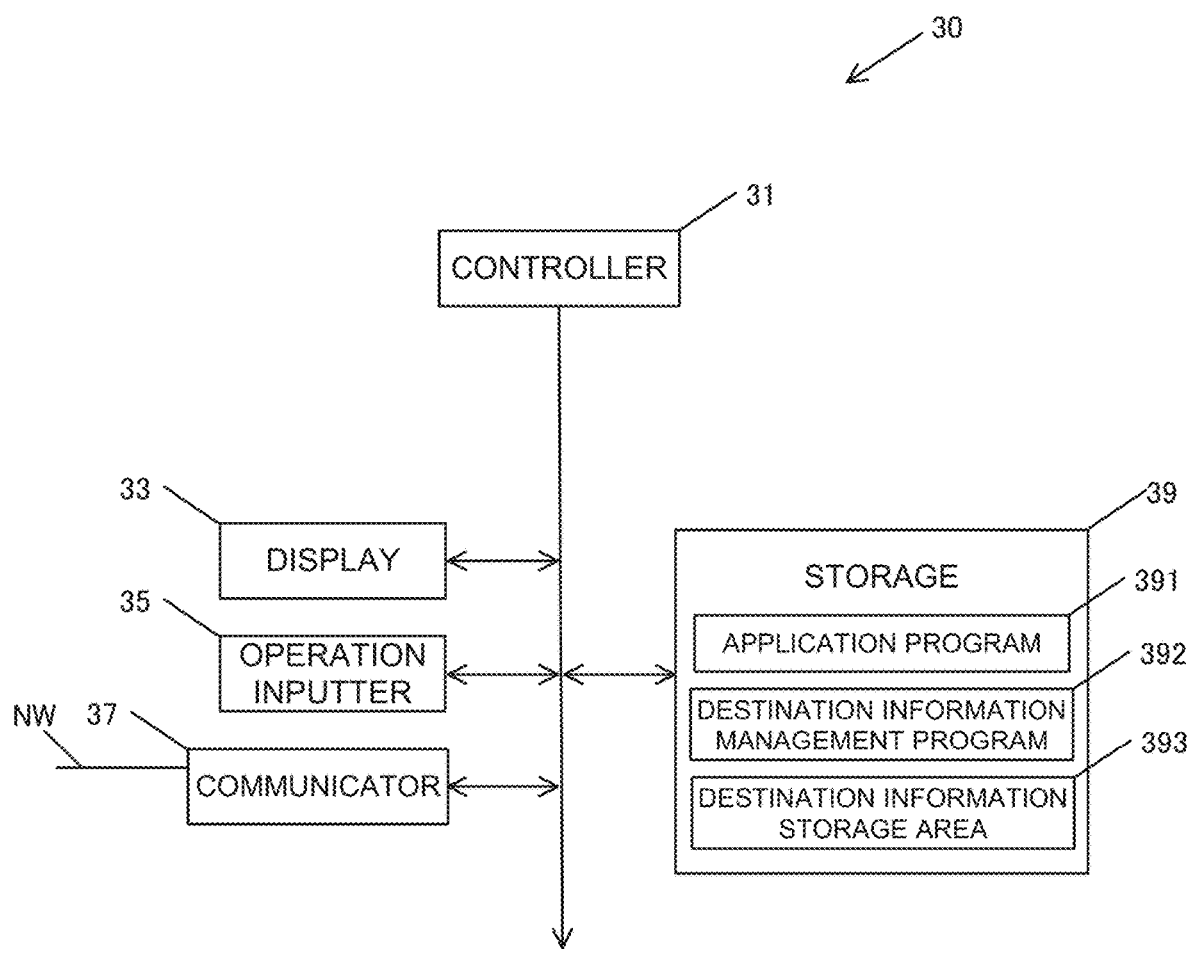
FIG. 4 illustrates the functional configuration of a terminal device according to the first embodiment.

FIG. 4 illustrates the functional configuration of the terminal device 30. The terminal device 30 according to the present disclosure is assumed to be a so-called mobile terminal device including, but not limited to, a smartphone, a tablet, a cell phone, a laptop, or the like. A mounted-type terminal device, such as a desktop computer, is also provided as the terminal device of the present disclosure when such a terminal device is in an environment capable of communicating with the multifunction peripheral 10.

The terminal device 30, as described above, includes a controller 31, a display 33, an operation inputter 35, a communicator 37, and a storage 39.

The controller 31 comprehensively controls the terminal device 30. The controller 31 is composed of, for example, one or more arithmetic devices (such as a CPU). The controller 31 implements its functions by reading and executing various programs stored in the storage 39.

The display 33 displays various information to the user. The display 33 may include, for example, an LCD or an organic EL display.

The operation inputter 35 accepts input of information by the user or the like. The operation inputter 35 may include a touch panel that allows input via the display 33. In such a case, the input on the touch panel may be detected using a resistive film, an infrared light, electromagnetic induction, capacitance, or the like.

The communicator 37 has an interface for near field communication such as Bluetooth, Wi-Fi, Wi-SUN, Irda, or the like. The communicator 37 can also have at least one of a wired interface and a wireless interface to communicate with other devices via a network not illustrated, such as LAN, WAN, the Internet, telephone lines, fax lines, or the like.

The storage 39 stores various programs and various kinds of data necessary for the operation of the terminal device 30. The storage 39 may include, for example, storage devices such as a RAM, an HDD, an SSD, and a ROM.

The storage 39 stores an application program 391 and a destination information management program 392, and secures a destination information storage area 393.

The application program 391 is a program read by the controller 31 in executing various applications, such as phone calls, e-mail, fax, SNS, video and music viewing, and game.

The destination information management program 392 is a program read by the controller 31 in managing destination information, such as a telephone number, an e-mail address, a fax number, and an account of the destination that are used in applications such as phone calls, e-mail, fax, SNS, or the like. The controller 31 performs processing such as new registration, editing, and deletion of the destination information in accordance with an instruction from the user. The controller 31 reads and outputs the managed destination information in accordance with a request to acquire the destination information from the multifunction peripheral 10. When a request to acquire destination information is made in accordance with the PBAP, the controller 31 can export the destination information in the vCard format. The destination information can also be exported in a comma separated value (CSV) format. In such a case, the controller 31 can export all pieces of destination information and then transmit them collectively to the multifunction peripheral 10. The destination information management program 392 may be provided as a management program incorporated in the application program 391.

The destination information storage area 393 is a storage area for storing, for example, telephone numbers, e-mail addresses, fax numbers, accounts, and the like as destination information managed by the terminal device 30.

1.2 Process Flow

Figure 5:
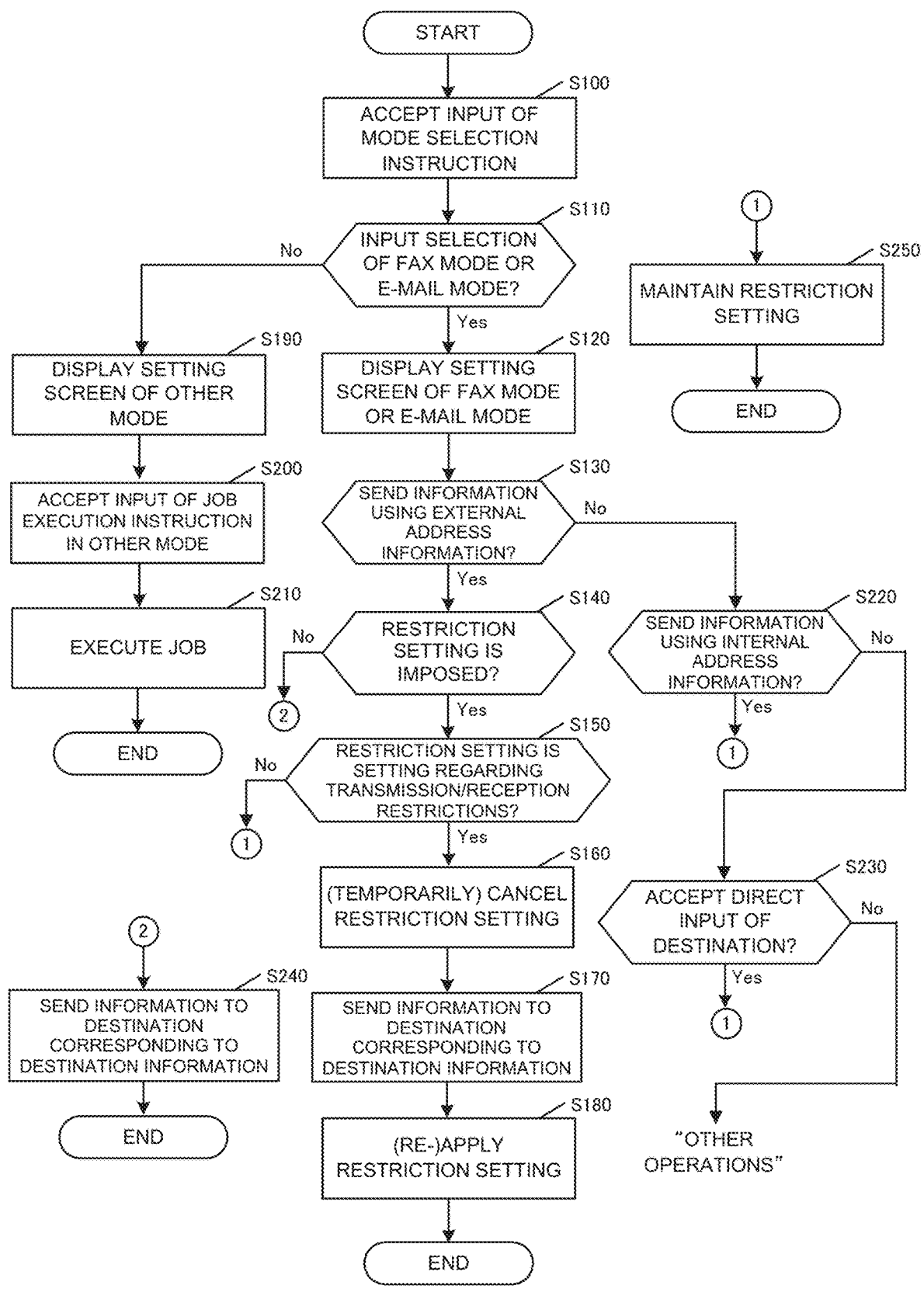
FIG. 5 is a flowchart illustrating a process flow according to the first embodiment.

The process flow according to the first embodiment will now be described with reference to FIG. 5. The process described with reference to FIG. 5 is a mode for determining whether the restriction setting is maintained or canceled in accordance with whether or not the destination information as management information is external address information acquired from the terminal device 30 or internal address information managed internally by the multifunction peripheral 10. The process described with reference to FIG. 5 is executed by the controller 11 by reading the job execution program 231, the display processing program 232, the restriction setting determination program 234, or the like.

The controller 11 accepts input of a mode selection instruction for the copy mode, the scan mode, the E-mail mode, the fax mode, or the like by a user via the home screen or the like (step S100).

The controller 11 determines whether or not the fax mode or the e-mail mode has been selected among the modes accepted for selection (step S110).

If it is determined that the fax mode or the e-mail mode has been selected by the user, the controller 11 causes the setting screen of the fax mode or the e-mail mode to appear on the display 13 (step S110; if Yes, the process proceeds to step S120).

Subsequently, the controller 11 determines whether or not the fax transmission in the fax mode or the e-mail transmission in the e-mail mode is information transmission using the external address information (step S130). Here, when the acquisition of the external address information from the terminal device 30 is completed, the controller 11 can determine that the information is transmitted using the external address information by receiving input of a selection instruction of the destination information included in the acquired external address information. When the acquisition of the external address information from the terminal device 30 is not completed, the controller 11 can determine that the information is transmitted using the external address information by receiving an acquisition request of the external address information.

If it is determined that the information is transmitted using the external address information, the controller 11 determines whether or not the restriction setting is imposed on the multifunction peripheral 10 (step S130; if Yes, the process proceeds to step S140).

If it is determined that the restriction setting is imposed on the multifunction peripheral 10, the controller 11 determines whether or not the imposed restriction setting is, for example, a setting regarding restrictions on the transmission and reception of information via the communicator 17 (system restrictions), such as "prohibition of selection from the address book" and "prohibition of direct input" (step S140; if Yes, the process proceeds to step S150).

If it is determined that a setting regarding restrictions on the transmission and reception of information is imposed, the controller 11 temporarily cancels the restriction setting (step S150; if Yes, the process proceeds to step S160).

The controller 11 then sends the information to the destination specified by the destination information (step S170). The controller 11 re-applies the restriction setting temporarily canceled in step S160 (step S180), and the process ends.

If it is determined in step S110 that the fax mode or the e-mail mode is not selected by the user, the controller 11 causes a setting screen (for example, a copy setting screen) of another mode selected by the user to appear on the display 13 (step S110; if No, the process proceeds to step S190).

Upon accepting input of a job execution instruction in the other mode, the controller 11 executes the job of the mode (step S200; the process proceeds to step S210), and the process ends.

When it is determined in step S130 that the information is not transmitted using the external address information, the controller 11 determines whether or not the information is transmitted using the internal address information (step S130; if No, the process proceeds to step S220). Here, the controller 11 can determine that the information is transmitted using the internal address information by receiving input of a selection instruction of the destination information included in the internal address information.

If it is determined that the information is transmitted using the internal address information, the controller 11 maintains the restriction setting, and the process ends (step S220; if Yes, the process proceeds to step S250).

When it is determined that the information is not transmitted using the internal address information, the controller 11 determines whether or not direct input of the destination has been accepted (step S220; if No, the process proceeds to step S230).

If it is determined that direct input of the destination has been accepted, the controller 11 maintains the restriction setting, and the process ends (step S230; if Yes, the process proceeds to step S250). If it is determined that direct input of the destination has not been accepted, the controller 11 determines that the process is another process and executes operations corresponding to the other process (step S230; if No, the process proceeds to "other operations").

If it is determined in step S140 that no restriction setting is imposed on the multifunction peripheral 10, the controller 11 sends the information to the destination corresponding to the destination information, and the process ends (step S140; if No, the process proceeds to step S240).

If it is determined in step S150 that no restriction setting regarding the transmission and reception of information is imposed, the controller 11 maintains the restriction setting in accordance with other restriction settings, and the process ends (step S150; if No, the process proceeds to step S250).

1.3 Operation Example

Figure 6:
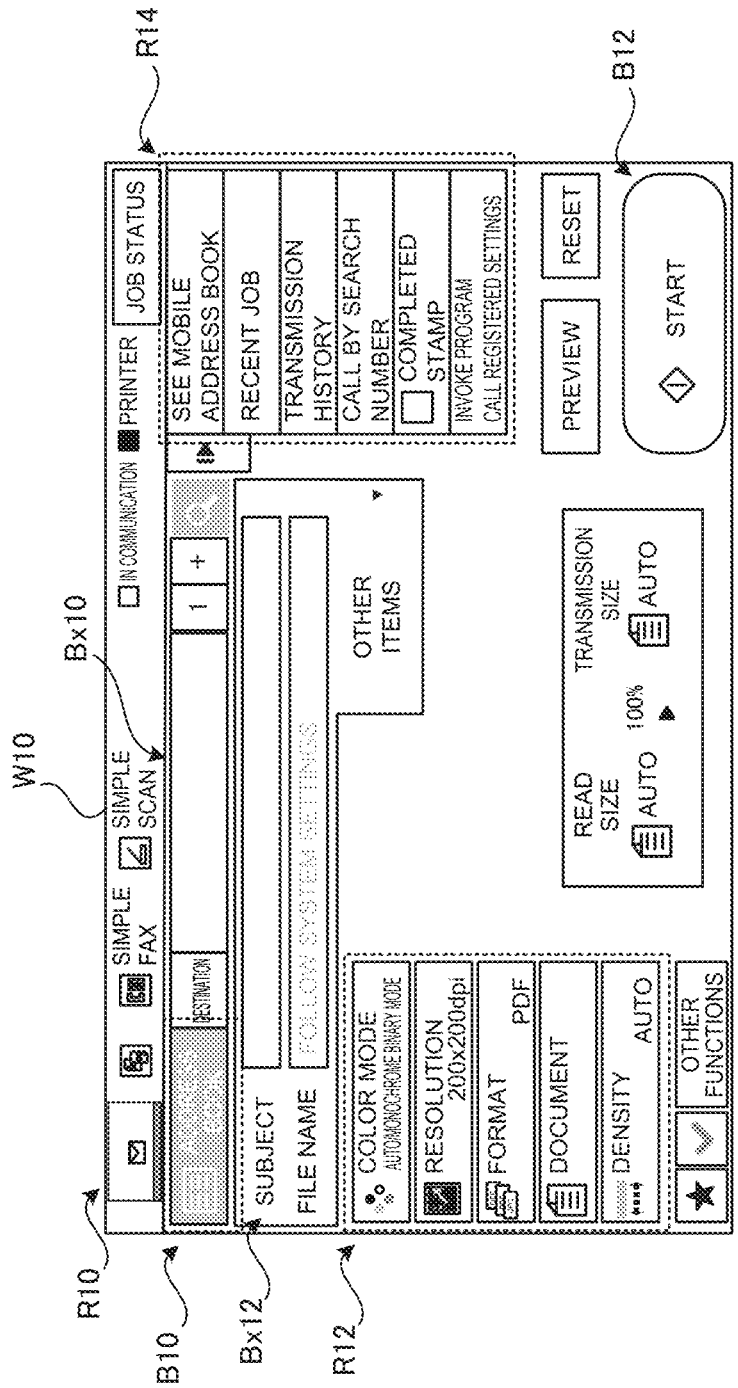
FIG. 6 illustrates an operation example in the first embodiment.
Figure 7:
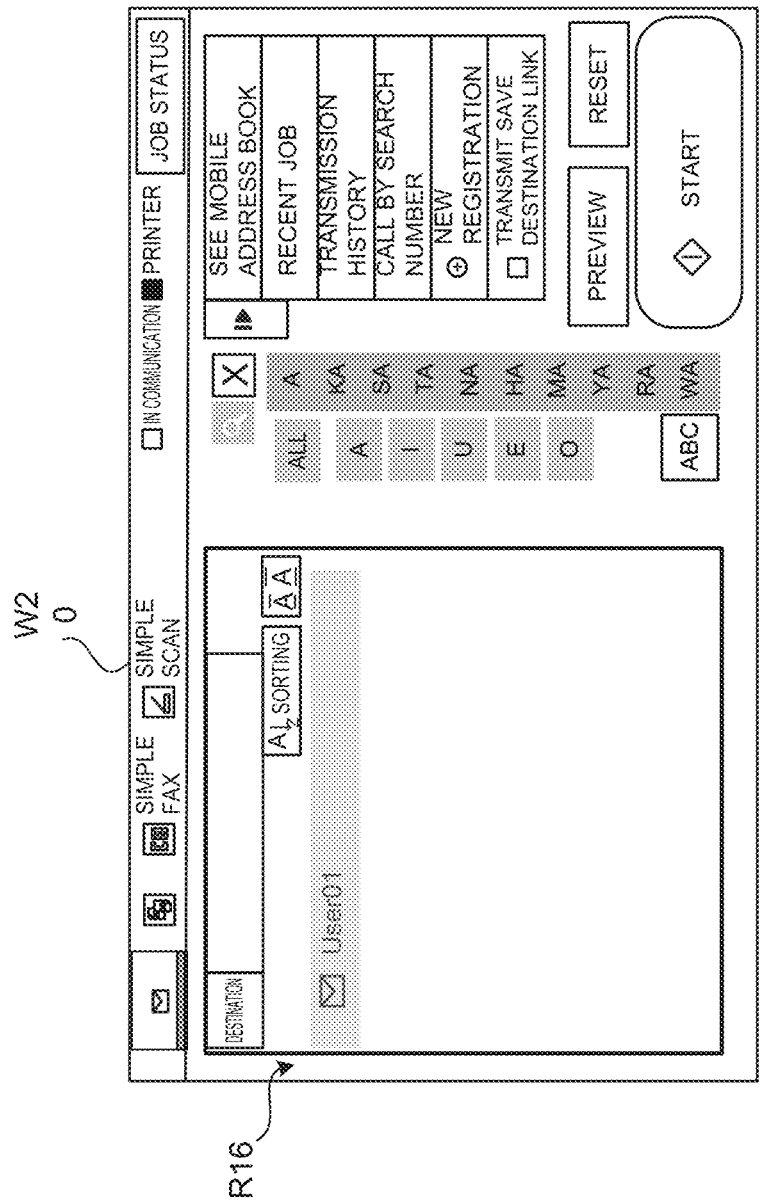
FIG. 7 illustrates an operation example in the first embodiment.

An operation example according to the first embodiment will now be explained. FIGS. 6 and 7 are diagrams for explaining an operation example in sending information by using the internal address information managed internally by the multifunction peripheral 10 when a restriction setting (system restriction) regarding the transmission and reception of information via the communicator 17, such as "prohibition of selection from the address book" and "prohibition of direct input," is imposed as a restriction setting. Note that the operation example corresponds to the processing of steps S120, S130 (No), S220, S230, S250, etc., in FIG. 5.

FIG. 6 illustrates a configuration example of a setting screen W10 of the e-mail mode. The setting screen W10 includes a mode display area R10, a setting value display area R12, a function selection area R14, an address book button B10, a start button B12, a destination input box Bx10, and a subject input box Bx12.

The mode display area R10 is a display area for displaying icons representing the respective modes. Since FIG. 6 illustrates a configuration example of the setting screen W10 of the e-mail mode, the icon representing the e-mail mode in the mode display area R10 is provided with an underbar indicating that the e-mail mode is selected.

The setting value display area R12 is a display area for displaying setting values (setting items) of e-mail transmission executed via the setting screen W10. FIG. 6 illustrates an example in which a color mode "auto/monochrome binary," a resolution "200×200 dpi," a format "PDF," etc., are displayed as setting values for the e-mail transmission job.

The function selection area R14 is a display area for displaying function selection keys that accept selection of a function settable for executing the e-mail transmission. FIG. 6 illustrates an example of the function selection keys, such as a "see mobile address book" key, a "recent job" key, a "transmission history" key, etc., as described below.

The address book button B10 is a button for accepting input of a reference instruction for the internal address information managed by the multifunction peripheral 10. Upon receiving an instruction to select the address book button B10, the controller 11 causes the address book screen, which is described with reference to FIG. 7, to appear.

The start button B12 is a button for accepting input of an instruction for executing an e-mail transmission whose destination is the e-mail address set in the destination input box Bx10.

The destination input box Bx10 is an input box for accepting input of an e-mail address as a destination of the e-mail transmission. In the first embodiment, when a restriction setting regarding the transmission and reception of information is imposed, direct input of the destination information into the destination input box Bx10 is restricted.

The subject input box Bx12 is an input box for accepting input of the subject of the e-mail and the file name of the file to be attached to the e-mail.

FIG. 7 is a diagram for explaining a configuration example of an address book screen W20 that appears when the controller 11 receives a selection input of the address book button B10 of the setting screen W10 of FIG. 6. The address book screen W20 has a destination information display area R16.

The destination information display area R16 is a display area for displaying the internal address information managed by the multifunction peripheral 10. However, when a restriction setting regarding the transmission and reception of information is imposed as a restriction setting, the displayed destination information appears in a grayed-out state, so that the destination information cannot be selected.

In a case where a restriction setting (system restriction) regarding the transmission and reception of information via the communicator 17, such as "prohibition of selection from the address book" and "prohibition of direct input," is imposed as a restriction setting, information cannot be transmitted using the internal address information managed internally by the multifunction peripheral 10. According to the specifications of the multifunction peripheral 10, the e-mail mode itself cannot be prohibited, but as illustrated in FIGS. 6 and 7, transmission in the e-mail mode can be indirectly restricted by prohibiting selection of destination information from internal address information and direct input of destination information.

An operation example will now be explained in which information is sent by using the external address information acquired by the terminal device 30 when a restriction setting (system restriction) regarding the transmission and reception of information via the communicator 17, such as "prohibition of selection from the address book" and "prohibition of direct input," is imposed as a restriction setting.

Figure 8:
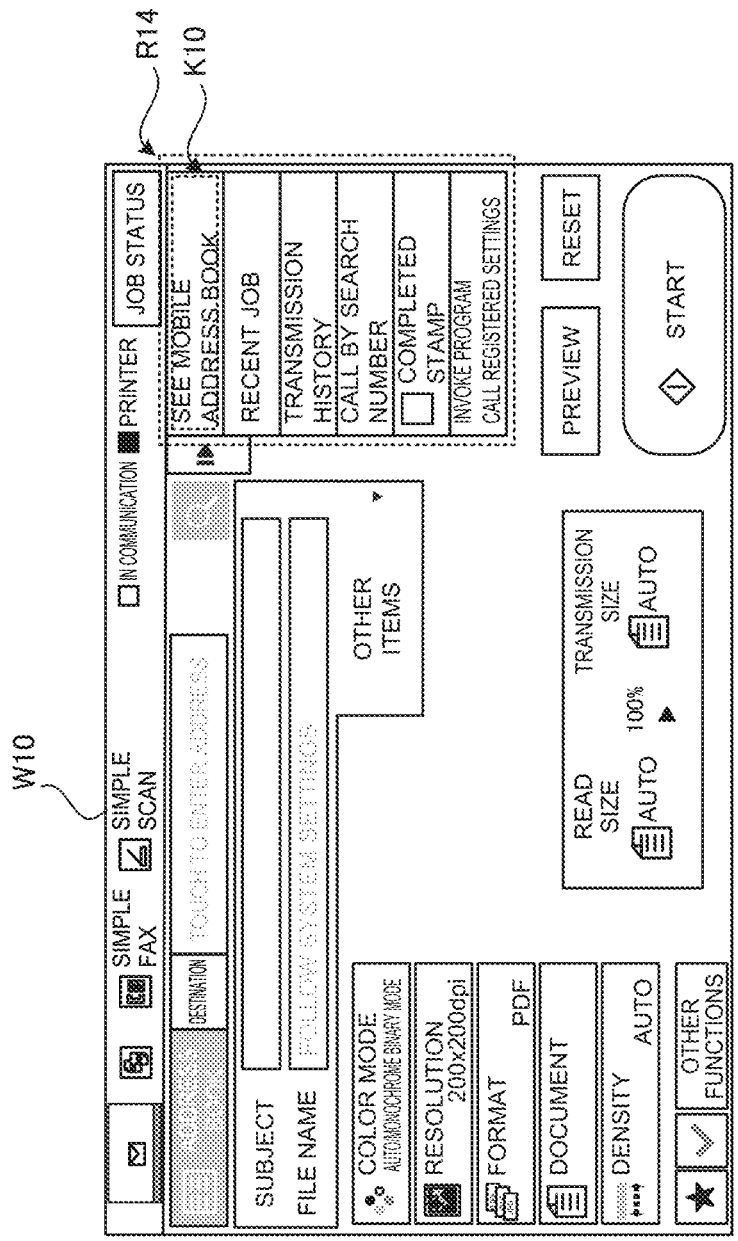
FIG. 8 illustrates an operation example in the first embodiment.

FIG. 8 illustrates the same setting screen W10 for e-mail transmission described in FIG. 6. The user can use the external address information by selecting a "see mobile address book" key K10 in the function selection area R14. Upon receiving an instruction to select the "see mobile address book" key K10, the controller 11 causes the address book screen, which is described with reference to FIG. 9, to appear.

Figure 9:
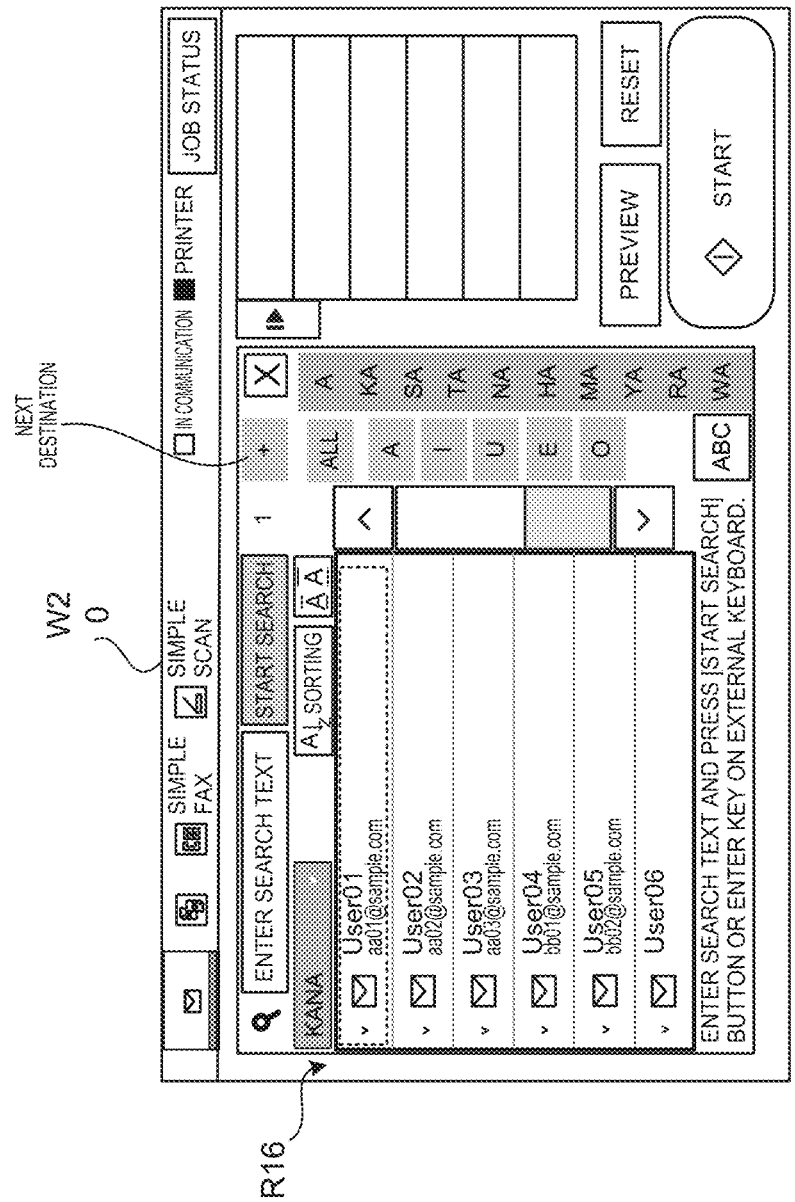
FIG. 9 illustrates an operation example in the first embodiment.

FIG. 9 illustrates a configuration of the address book screen W20 that appears in response to the controller 11 receiving the selection of the "see mobile address book" key K10 on the setting screen W10 of FIG. 8. The address book screen W20 illustrated in FIG. 9 may have the same configuration as the address book screen W20 illustrated in FIG. 7.

Unlike the example in FIG. 7, in FIG. 9, the destination information for user names "User01" to "User06" (e.g., e-mail address "aa01@sample.com, etc.) are displayed as the external address information that can be selected.

The user can select the desired destination information from the external address information displayed in the destination information display area R16 and set it as the destination for the e-mail transmission.

Figure 10:
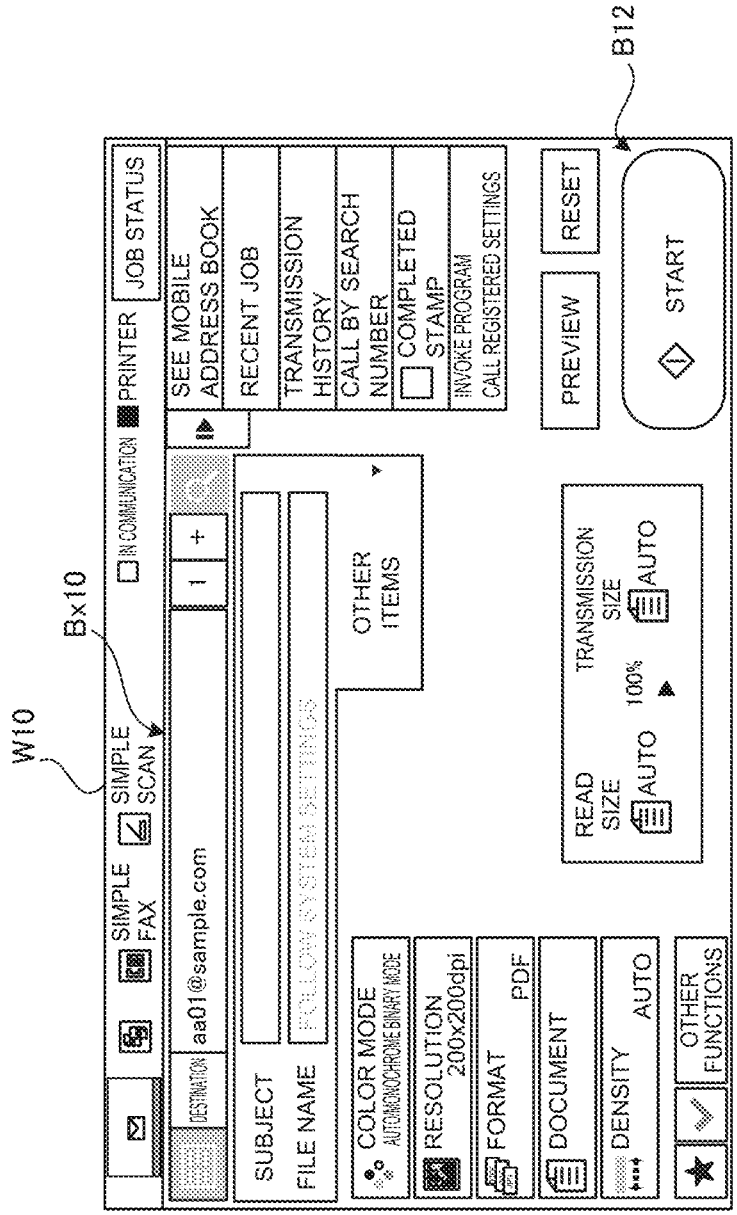
FIG. 10 illustrates an operation example in the first embodiment.

FIG. 10 is a diagram for explaining one piece of destination information (for example, User01 (aa01@sample.com)) being selected by the user from the external address information displayed in the destination information display area R16, and the destination information being set in the destination input box Bx10.

The user confirms that the selected destination information is set in the destination input box Bx10 and selects the start button B12, to perform e-mail transmission with the destination information as the transmission destination.

Even when a restriction setting (system restriction) regarding the transmission and reception of information via the communicator 17, such as "prohibition of selection from the address book" and "prohibition of direct input," is imposed as a restriction setting, the usage of the external address information acquired from the terminal device 30 cancels the "prohibition of selection from the address book" as a restriction setting, and destination information can be selected from the external address information.

In the setting screen W10 regarding e-mail transmission, specific destination information selected from the external address information can be set as a transmission destination.

Thus, according to the first embodiment, when the address information as management information is the external address information acquired from the terminal device, the imposed restriction setting can be canceled, and information such as e-mail transmission can be sent and received via the communicator.

2. Second Embodiment

The second embodiment allows the imposed restriction setting to be canceled and external address information to be acquired when an acquisition request for the external address information to the terminal device is satisfied, and the restriction setting relates to communication connection restrictions.

2.1 Functional Configuration

The functional configurations according to the second embodiment can be the same functional configurations as those of the multifunction peripheral 10 and the terminal device 30 according to the first embodiment. Therefore, in the second embodiment, the same configurations as those in the first embodiment are denoted by the same reference numerals, and the descriptions thereof are omitted.

2.2 Process Flow

Figure 11:
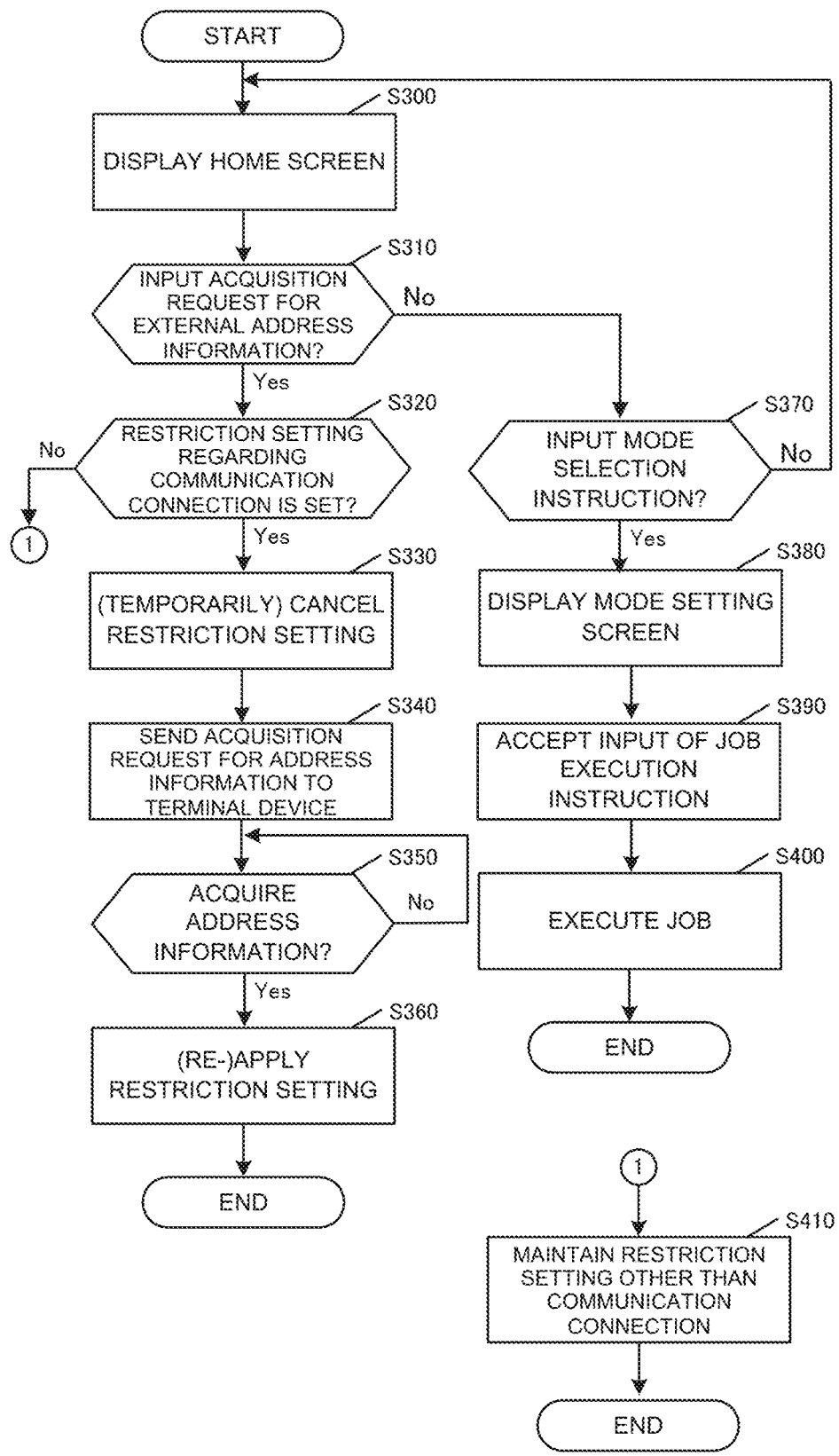
FIG. 11 is a flowchart illustrating a process flow according to a second embodiment.

FIG. 11 is a flowchart illustrating a process flow according to the second embodiment. The process explained with reference to FIG. 11 is executed by the controller 11 by reading the job execution program 231, the display processing program 232, the destination information acquisition program 233, or the like. The process explained below is initiated by the reception of an instruction to select the mobile address book button on the home screen, which is described below.

The controller 11 causes the home screen as the initial screen to appear at an appropriate timing, for example, when the power is turned on, when the device is restored from sleep mode, or when the device is initialized (step S300). Subsequently, the controller 11 determines whether or not an acquisition request for the external address information has been accepted via the home screen (step S310).

In such a case, the controller 11 can determine whether or not an acquisition request for the external address information has been received by accepting input of a selection instruction for the mobile address book button on the home screen.

If it is determined that input of an acquisition request for external address information has been accepted, the controller 11 determines whether or not a restriction setting regarding communication connection, such as "prohibition of Bluetooth communication," is imposed on the multifunction peripheral 10 (step S310; if Yes, the process proceeds to step S320).

If it is determined that a restriction setting regarding the transmission connection to the multifunction peripheral 10 is imposed, the controller 11 (temporarily) cancels the restriction setting (step S320; if Yes, the process proceeds to step S330).

Subsequently, the controller 11 controls the communicator 17 to send an acquisition request of the external address information to the terminal device 30, and determines whether or not the external address information has been acquired from the terminal device 30 (step S340; the process proceeds to step S350). Upon receiving an acquisition request of the external address information, the terminal device 30 outputs the destination information it manages as external destination information.

In step S350, when it is determined that external address information has been acquired from terminal device 30, the controller 11 re-applies the temporarily canceled restriction setting, and the process ends (step S350; if Yes, the process proceeds to step S360). If the address information cannot be acquired from the terminal device 30, the controller 11 waits until the address information is acquired (step S350; No).

If no input of an acquisition request for the external address information is accepted, the controller 11 determines whether or not input of a mode selection instruction is accepted. That is, the controller 11 determines whether or not input of a mode selection instruction for the copy mode, the scan mode, the e-mail mode, or the fax mode by a user has been accepted via the home screen or the like (step S310; if No, the process proceeds to step S370).

If it is determined that input of a mode selection instruction of the copy mode, the scan mode, the e-mail mode, or the fax mode by the user has been accepted via the home screen or the like, the controller 11 causes the setting screen of the mode selected by the user to appear on the display 13 (step S370; if Yes, the process proceeds to step S380). If the controller 11 determines that no input of a mode selection instruction by the user has been accepted, the process returns to step S300 (step S370; if No, the process returns to step S300).

Upon accepting input of a job execution instruction via a mode setting screen, the controller 11 executes the job, and the process ends (step S390; the process proceeds to step S400).

If it is determined in step S320 that no restriction setting regarding the communication connection to the multifunction peripheral 10 is imposed, the controller 11 maintains the restriction setting when a restriction setting other than that of the communication connection is imposed, and the process ends (step S320; if No, the process proceeds to step S410).

2.2 Operation Example

Figure 12:
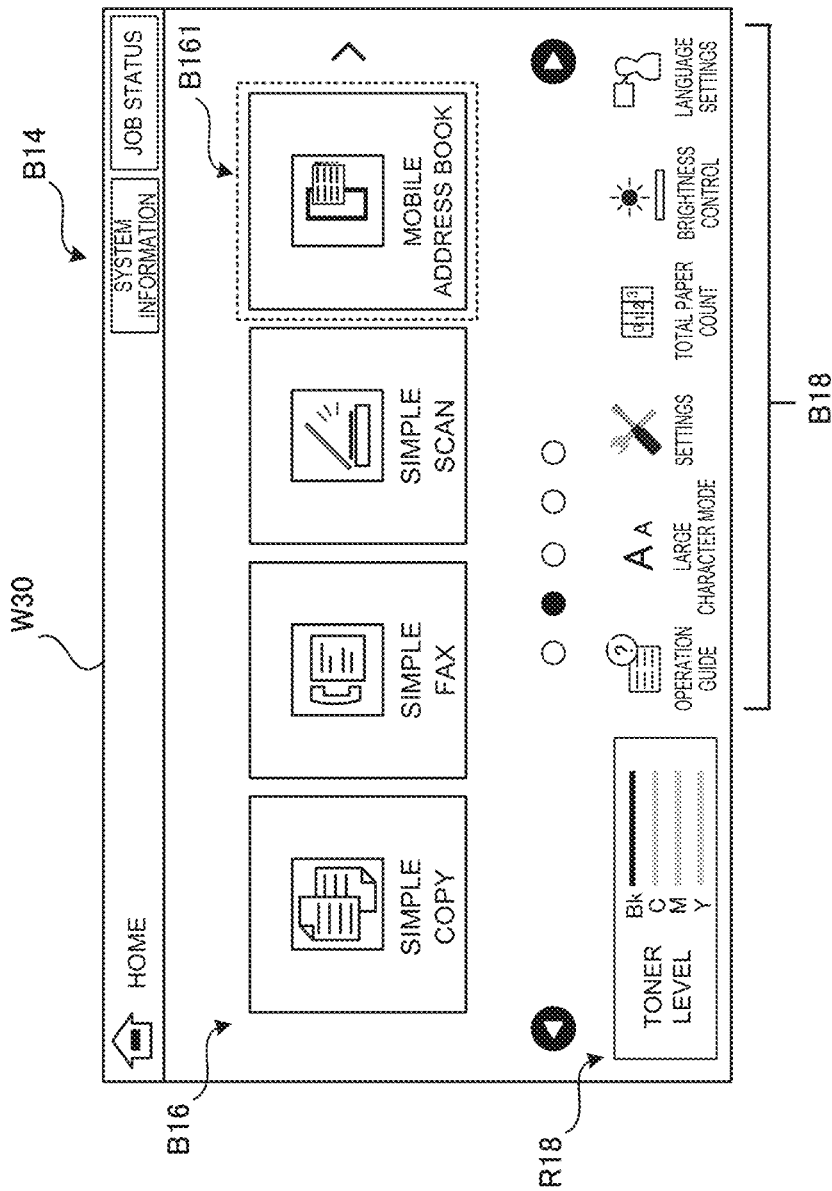
FIG. 12 illustrates an operation example in the second embodiment.

An operation example according to the second embodiment will now be explained. FIG. 12 illustrates a configuration example of a home screen W30 of the multifunction peripheral 10. The home screen W30 is an initial screen that is displayed on the display 13 when, for example, power is turned on, or the multifunction peripheral is in a standby mode, or recovered from a sleep mode, and receives an operation input from the user. The home screen W30 includes a system information button B14, mode selection buttons B16, a device status display area R18, and function selection buttons B18.

The system information button B14 is a button that accepts q display instruction for a system information screen, which will be described with reference to FIG. 13. Upon accepting selection input of the system information button B14 by the user, the controller 11 causes a system information screen W40 to be displayed.

The mode selection buttons B16 are buttons that accept selection of the mode. Upon accepting selection input of the mode selection buttons B16, the controller 11 causes the setting screen of the corresponding mode to be displayed. The mode selection buttons B16 include a "mobile address book" button B161 that accepts input of an acquisition request of the external address information. When the controller 11 receives input of the "mobile address book" button B161 selected by the user, the controller 11 executes the process of step S320 and the subsequent steps in FIG. 11 and acquires the external address information from the terminal device 30.

The device status display area R18 is an area for displaying the device status of the multifunction peripheral 10. In the example of FIG. 12, the toner level is displayed in the device status display area R18.

The function selection buttons B18 are buttons that accept a change instruction, a reference instruction, or the like, regarding function settings of the multifunction peripheral 10. Upon accepting selection input of the function selection buttons B18, the controller 11 causes each setting screen (not illustrated) for executing the change instruction or the reference instruction for the corresponding function.

Figure 13:
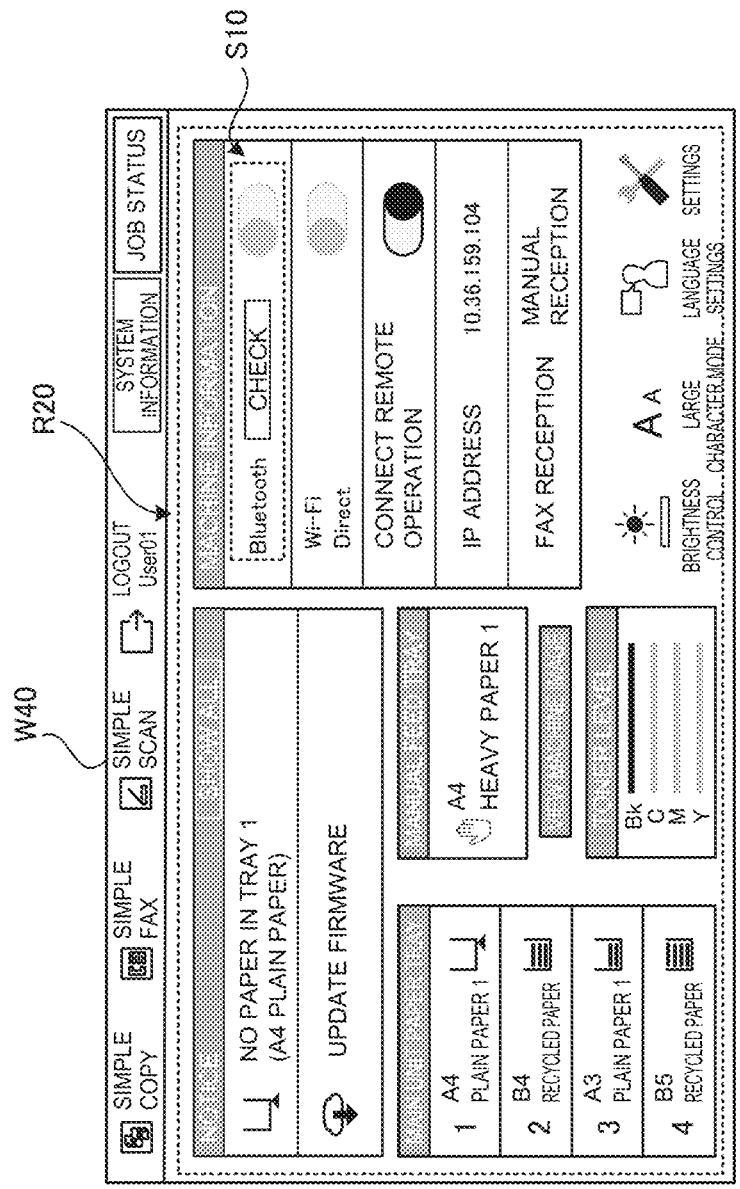
FIG. 13 illustrates an operation example in the second embodiment.

FIG. 13 illustrates a configuration example of the system information screen W40 that is displayed by the controller 11 in response to selection input of the system information button B14 of the home screen W30. The system information screen W40 is a screen that displays information about the system of the multifunction peripheral 10. The system information screen W40 includes an information display area R20 for displaying information including, for example, maintenance information of the device such as paper-out or firmware updates, and machine information such as communication settings. To enable communication using Bluetooth, the user needs to set a slider S10 in the machine information section to an "ON" state to activate Bluetooth communication. In FIG. 13, the slider S10 is in an "OFF" state, and a restriction setting regarding communication connection (Bluetooth) is being imposed.

Figure 14:
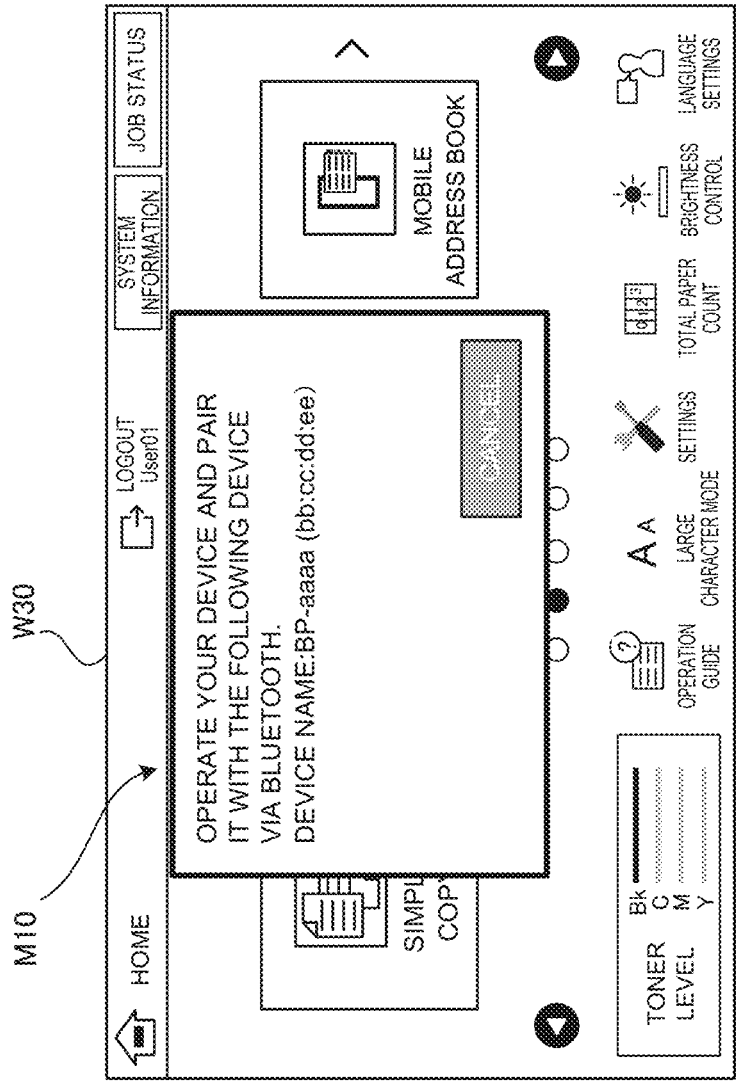
FIG. 14 illustrates an operation example in the second embodiment.

FIG. 14 illustrates a configuration example of a message screen M10 that is displayed on the home screen W30 until the connection (pairing) with the terminal device 30 is established after the "mobile address book" button B161 of the mode selection buttons B16 is pressed.

The message screen M10 can be a screen equivalent to a message screen usually displayed on typical devices that are to be connected using Bluetooth. That is, the message screen displays the name of the device to be connected (in the example of FIG. 14, the device name: BP-aaaa (bb:cc:dd: ee)). Although not illustrated in FIG. 14, a passkey (for example, pass key: 1234) for establishing connection may also be displayed. The user can establish the connection by entering the passkey to permit connection to the corresponding device.

Figure 15:
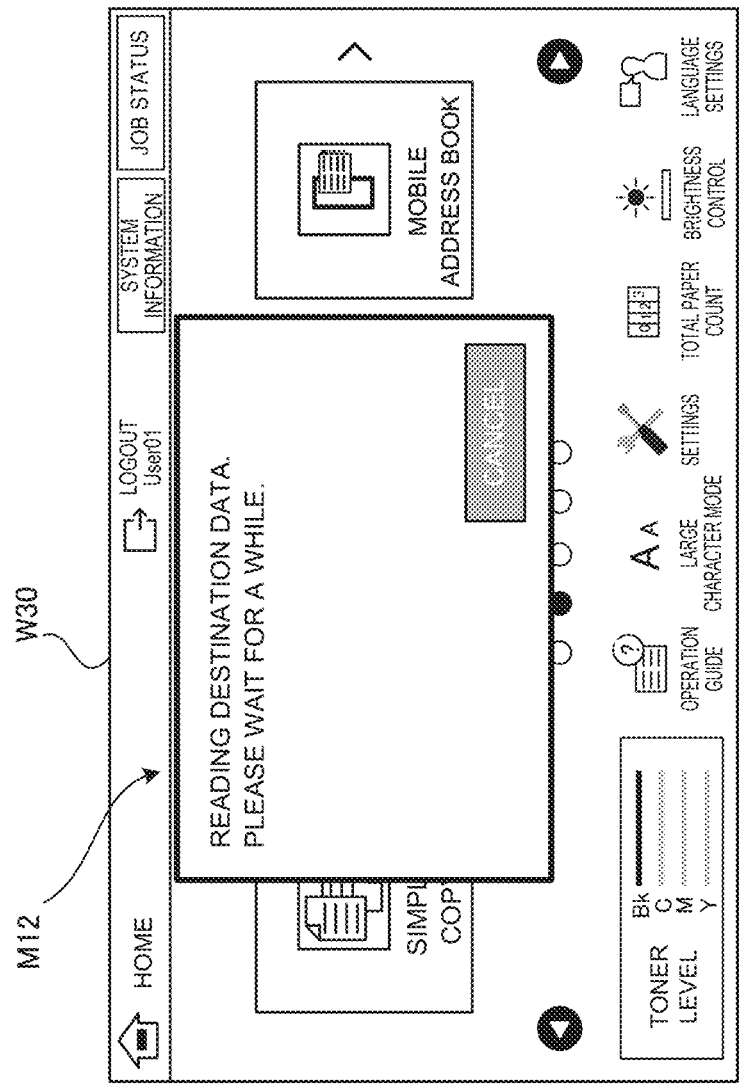
FIG. 15 illustrates an operation example in the second embodiment.

FIG. 15 illustrates a configuration example of a message screen M12 that is displayed after the connection with the terminal device 30 is established. Once the connection with the terminal device 30 is established, the controller 11 starts forwarding the destination information. The message screen M12 displays a message to report the forwarding status of the destination information.

Once the forwarding of the destination information as the external address information is completed, the controller 11 can cause the acquired external address information to be displayed in the destination information display area R16 of the address book screen W20 as illustrated in FIG. 9.

As described above, the second embodiment allows an imposed restriction setting to be canceled and external address information to be acquired when an acquisition request for external address information made to the terminal device is satisfied and when the restriction setting relates to communication connection restrictions.

3. Third Embodiment

In the third embodiment, the transmission and reception of information via the communicator is restricted on the basis of the authority determination result of whether or not operation authority in the fax mode, the e-mail mode, or the like is granted to an authenticated user.

3.1 Functional Configuration

Figure 16:
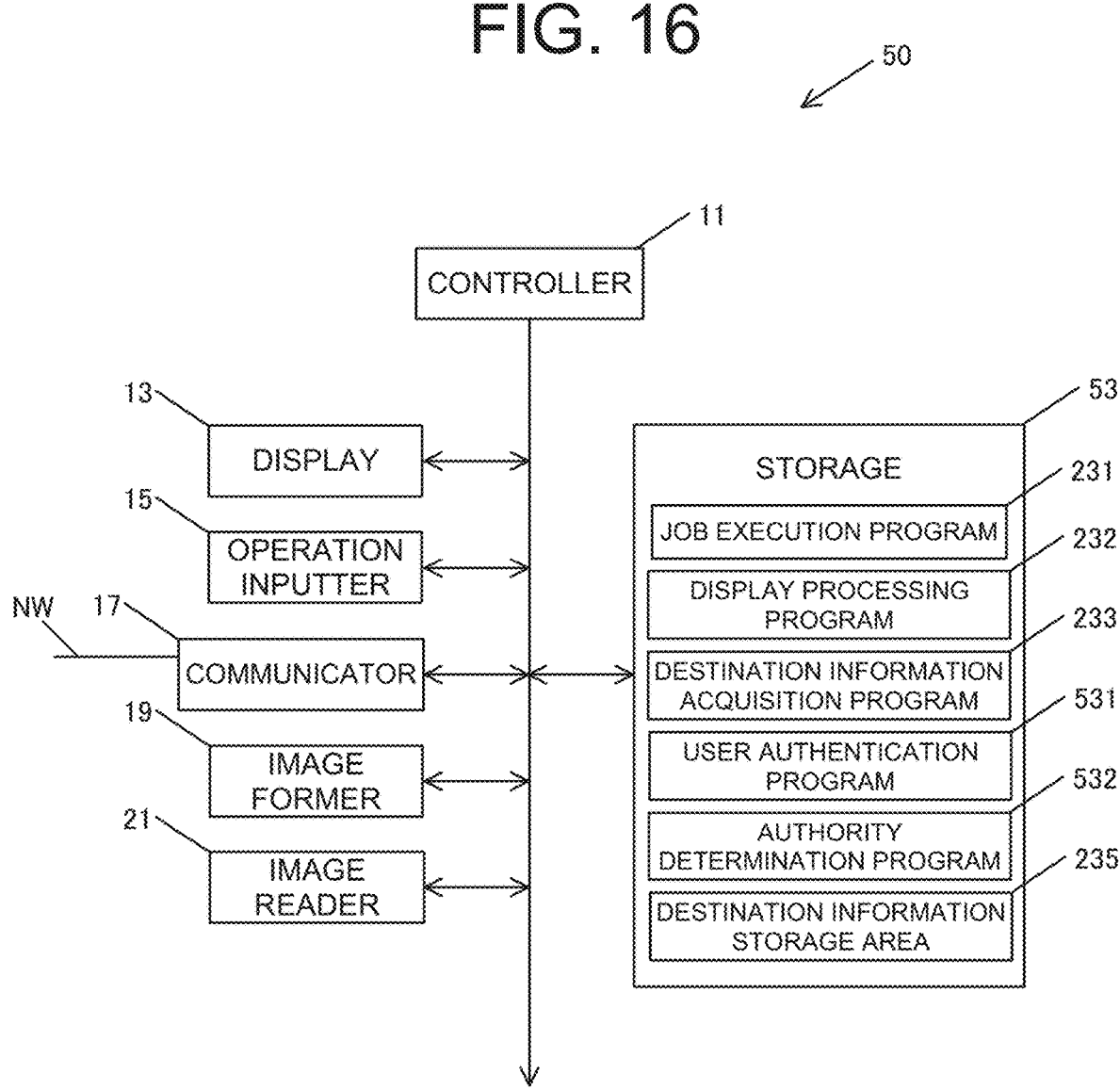
FIG. 16 illustrates the functional configuration of the multifunction peripheral according to a third embodiment.

FIG. 16 is a functional configuration diagram of a multifunction peripheral 50 according to the third embodiment. The configuration according to the multifunction peripheral 50 according to the third embodiment can be substantially identical to the functional configuration of the multifunction peripheral 10 according to the first embodiment. Therefore, the same configurations are denoted by the same reference numerals, and the different configurations are described.

The multifunction peripheral 50 includes a controller 11, a display 13, an operation inputter 15, a communicator 17, an image former 19, an image reader 21, and a storage 53.

In the third embodiment, the storage 53 stores a job execution program 231, a display processing program 232, a destination information acquisition program 233, a user authentication program 531 and an authority determination program 532, and has a destination information storage area 235.

The user authentication program 531 is a program that the controller 11 reads in authenticating the user (login user) who logs in to the multifunction peripheral 50. The controller 11 that has read the user authentication program 531 causes an authentication screen, which will be described later, to appear on the display 13 when the user authentication function is enabled. For example, the controller 11 stores the login user name associated with the login password in advance, and authenticates the user by matching the login user name and login password entered via the login screen. In addition to knowledge authentication based on the input of the login user name and login password, the login authentication can also be performed by possession authentication using a token, a key, an IC card, a smartphone, or the like, or biometric authentication using fingerprint, palm print, or blood vessel.

The authority determination program 532 is, for example, a program that is read by the controller 11 when the fax mode or the e-mail mode is selected, for example, via the home screen. The controller 11 that has read the authority determination program 532 can determine whether or not the operation authority is granted to the user who has selected the mode by referring to, for example, the user authority management table.

Here, FIG. 17 illustrates a configuration example of the data structure of the user authority management table. As illustrated in FIG. 17, the user authority management table can be configured by associating "Yes/No" indicating the presence/absence of the operation authority of each mode (fax mode, e-mail mode, etc.) with each login user name. The operation authority of each mode to the login user may be granted, for example, as user management information registered and managed by the administrator via a system setting screen (not illustrated). The results of the registration and management by the administrator are reflected in the user authority management table.

3.2 Process Flow

Figure 18:
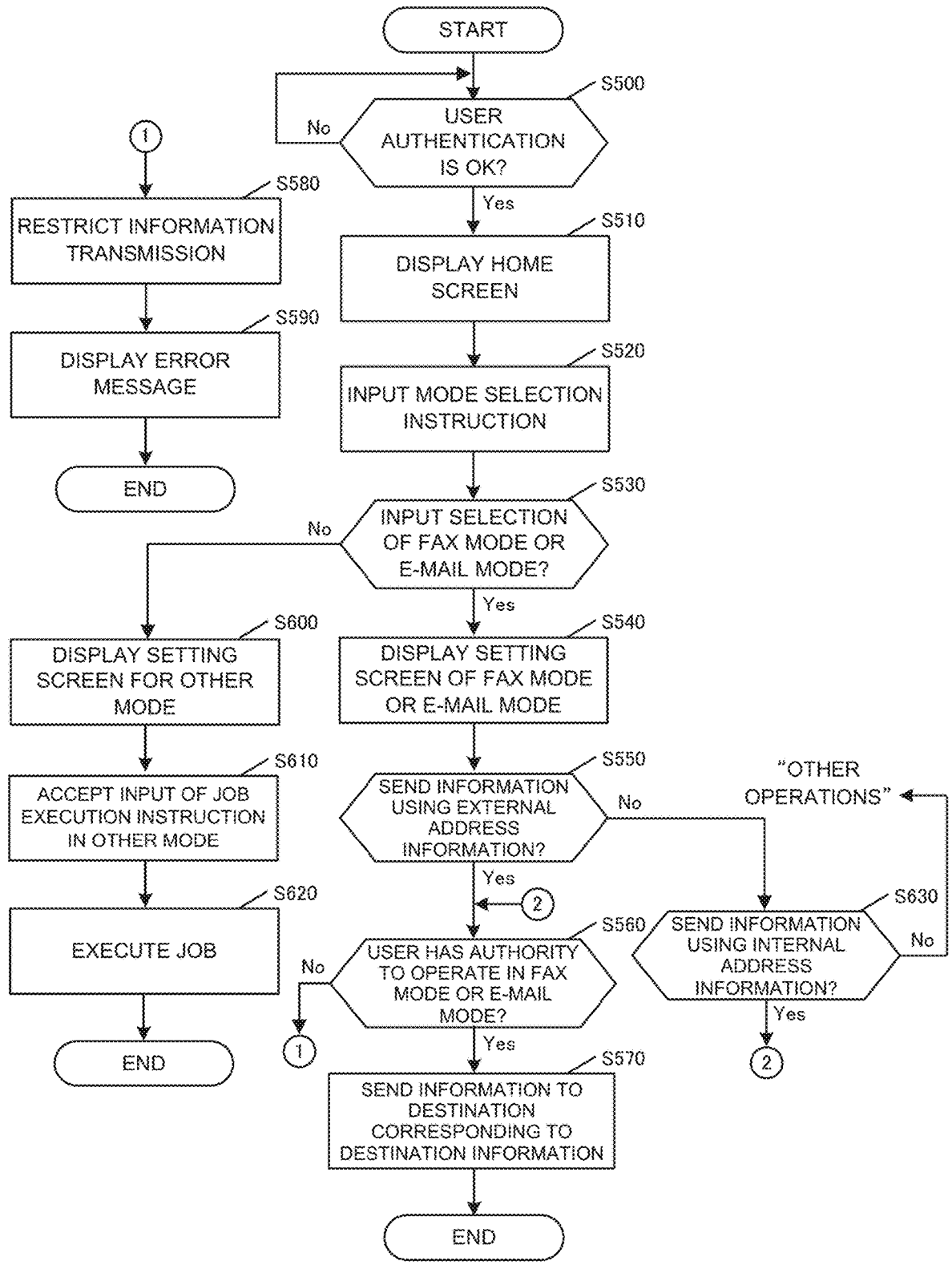
FIG. 18 is a flowchart illustrating a process flow according to the third embodiment.

FIG. 18 is a flowchart illustrating a process flow according to the third embodiment. The process described with reference to FIG. 18 is executed by the controller 11 by reading the job execution program 231, the display processing program 232, the user authentication program 531, the authority determination program 532, or the like. The process described with reference to FIG. 18 assumes that the user authentication function is enabled.

Figure 19:
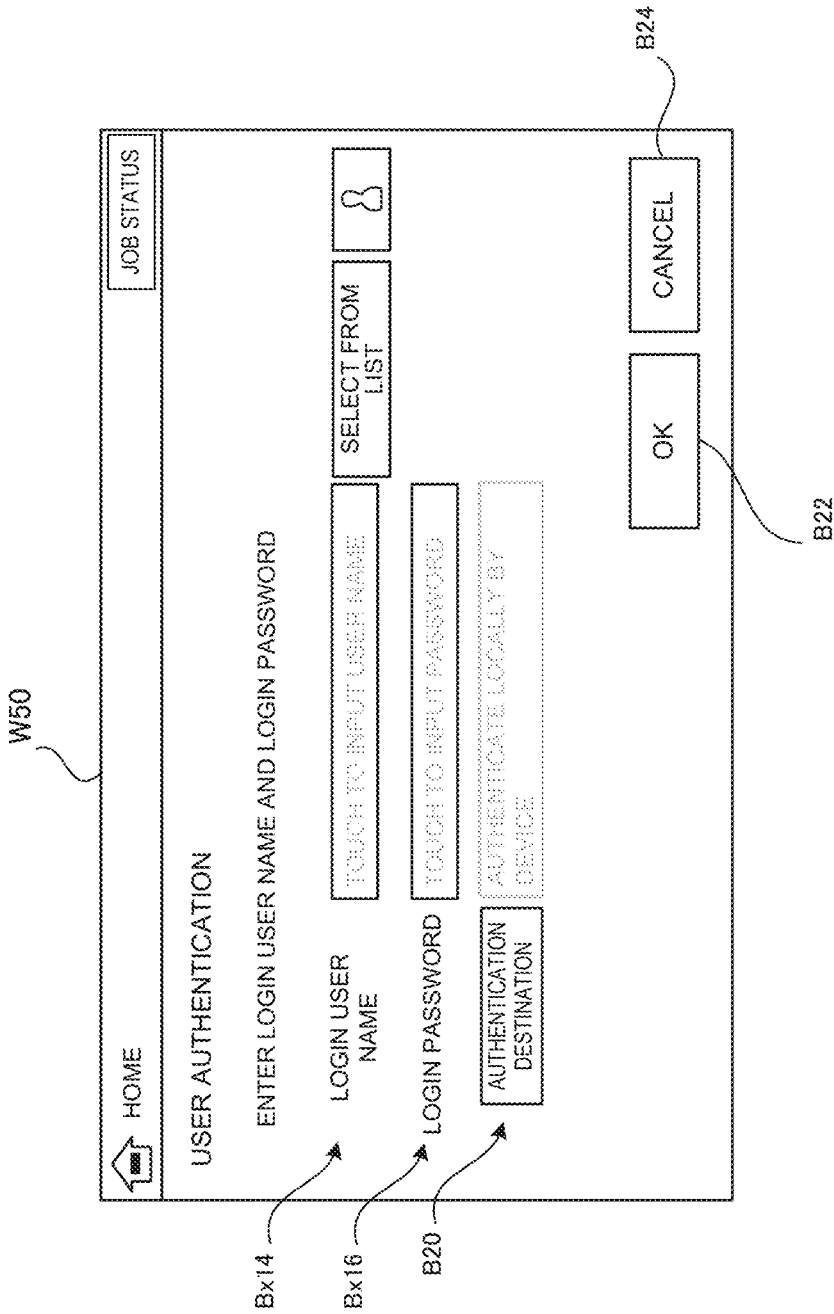
FIG. 19 illustrates an operation example in the third embodiment.

The controller 11 authenticates the user via an authentication screen described in FIG. 19 (step S500). For example, the controller 11 authenticates the user by using the login user name and login password input by the user via the authentication screen. If the user authentication is OK, the controller 11 causes the home screen as the initial screen to appear on the display 13 (step S500; if Yes, the process proceeds to step S510). If the login authentication is NG, the controller 11 waits until the correct login user name and login password are entered (step S500; No).

The controller 11 accepts input of a mode selection instruction by the login user via the displayed home screen (step S520). Subsequently, the controller 11 determines whether or not the accepted mode is the fax mode, the e-mail mode, another mode (step S530).

If it is determined that the accepted made is the fax mode or the e-mail mode, the controller 11 causes the setting screen of the fax mode or the e-mail mode to appear on the display 13 (step S530; if Yes, the process proceeds to step S540).

Subsequently, the controller 11 determines whether or not the fax transmission in the fax mode or the e-mail transmission in the e-mail mode is information transmission using the external address information (step S550). Here, when the acquisition of the external address information from the terminal device 30 is completed, the controller 11 can determine that the information is transmitted using the external address information by receiving input of a selection instruction of the destination information included in the acquired external address information. When the acquisition of the external address information from the terminal device 30 is not completed, the controller 11 can determine that the information is transmitted using the external address information by receiving an acquisition request of the external address information.

If it is determined that the information is transmitted using the external address information, the controller 11 determines whether or not the login user has the operation authority for the fax mode or the e-mail mode (step S550; if Yes, the process proceeds to step S560). By referring to the user authority management table illustrated in FIG. 17, the controller 11 can determine whether or not the login user has the operation authority for the fax mode or the e-mail mode.

If it is determined that the login user has the operation authority for the fax mode or the e-mail mode, the controller 11 transmits the information to the destination specified by the destination information (step S560; if Yes, the process proceeds to step S570), and the process ends.

If it is determined that the login user is not granted the operation authority for the fax mode or the e-mail mode, the controller 11 restricts the transmission of the information (step S560; if No, the process proceeds to step S580). The controller 11 then causes an error message to appear on the display 13 (step S590), and the process ends.

If it is determined in step S530 that the fax mode or the e-mail mode is not selected by the user, the controller 11 causes a setting screen (for example, a copy setting screen) of another mode selected by the user to appear on the display 13 (step S530; if No, the process proceeds to step S600).

Upon accepting input of a job execution instruction in the other mode, the controller 11 executes the job of the mode (step S610; the process proceeds to step S620), and the process ends.

When it is determined in step S550 that the information is not transmitted using the external address information, the controller 11 determines whether or not the information is transmitted using the internal address information (step S550; if No, the process proceeds to step S630). Here, the controller 11 can determine that the information is transmitted using the internal address information by receiving input of a selection instruction of the destination information included in the internal address information.

If it is determined that the information is transmitted using the internal address information, the controller 11 determines whether or not the login user has the operation authority for the fax mode or the e-mail mode (step S630; if Yes, the process returns to step S560). By referring to the user authority management table illustrated in FIG. 17, the controller 11 can determine whether or not the login user has the operation authority for the fax mode or the e-mail mode.

If it is determined that the login user has the operation authority for the fax mode or the e-mail mode, the controller 11 transmits the information to the destination specified by the destination information (step S560; if Yes, the process proceeds to step S570), and the process ends.

If it is determined that the login user does not have the operation authority for the fax mode or the e-mail mode, the controller 11 restricts the transmission of the information (step S580). The controller 11 then causes an error message to appear on the display 13 (step S590), and the process ends.

If it is determined in step S630 that the information is not transmitted using the internal address information, the controller 11 determines that it is another operation, and executes the operation corresponding to this operation (step S630; if No, the process proceeds to "another operation").

3.3 Operation Example

An operation example according to the third embodiment will now be explained. In the explanation of the operation example of the third embodiment, it is assumed that the e-mail mode is selected as the mode for transmitting information by the login user who does not have the operation authority of the e-mail mode.

FIG. 19 illustrates a configuration example of an authentication screen W50 displayed on the display 13 by the controller 11. The authentication screen W50 can be provided as a login screen displayed on the display 13 by the controller 11 that has read the user authentication program 531 when the login authentication function is enabled.

The authentication screen W50 includes a login user name input box Bx14, a login password input box Bx16, an authentication destination designation button B20, an OK button B22, and a cancel button B24.

The login user name input box Bx14 is an input box that accepts input of a login user name. A user attempting to log in to the multifunction peripheral 50 enters the login user name in the login user name input box Bx14. The login user name can also be selected from a separately established user name list.

The login password input box Bx16 is an input box that accepts the input of the login password corresponding to the login user name. The user attempting to log in to the multifunction peripheral 50 enters the login password along with the login user name.

The authentication destination designation button B20 is a button for accepting a destination where the user is to be authenticated. The user authentication may be performed locally by the device, or an authentication server or the like, for example, which is separately provided on the network (NW) may be designated. When it is designated that the authentication is made locally by the device, the controller 11 authenticates the user by comparing the entered login user name and login password with the authentication information prepared in advance (for example, a combination of the user name and the password, or the like). On the other hand, when using an authentication server or the like provided on the network (NW), the controller 11 can authenticate the user by transmitting the entered login user name and login password to the authentication server and receiving the authentication result from the authentication server.

The OK button B22 is a button that accepts input of confirmation instruction of an input operation by the user. The user selects the OK button B22 when the user confirms the input to the login user name input box Bx14 or the login password input box Bx16, or the designation of the destination where the user is to be authenticated via the authentication destination designation button B20. The cancel button B24 is a button that accepts input of a cancellation instruction of the input operation by the user.

Figure 20:
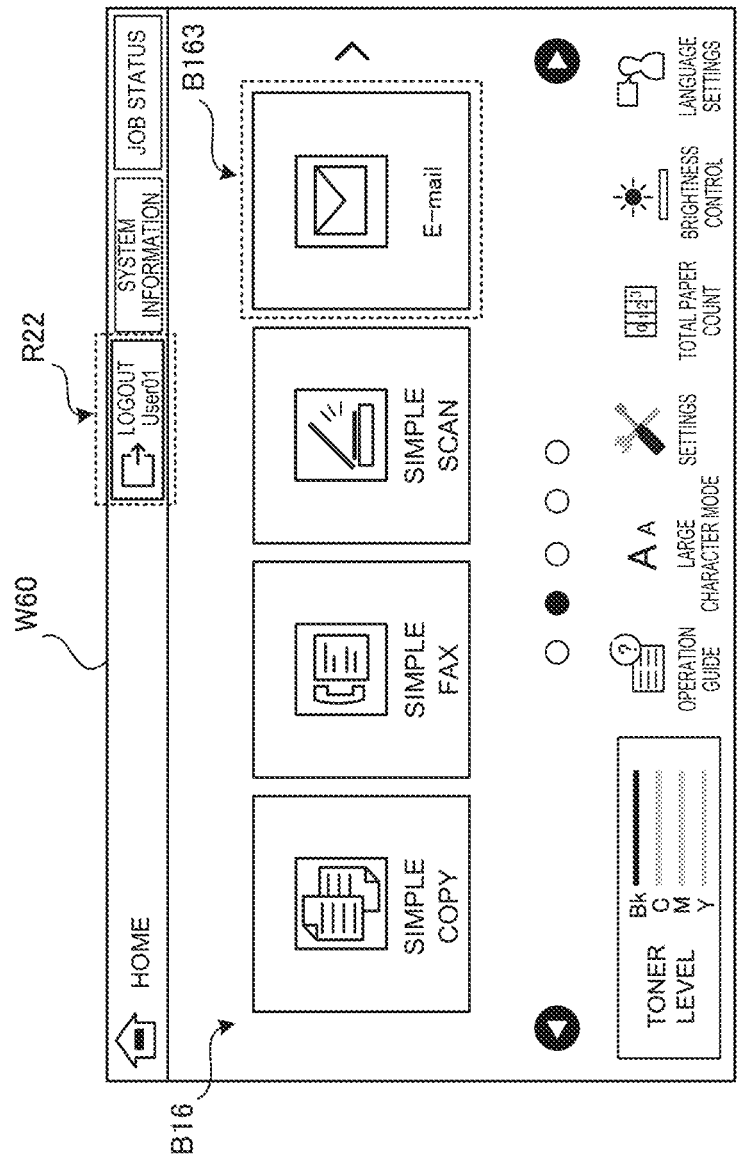
FIG. 20 illustrates an operation example in the third embodiment.

FIG. 20 illustrates a configuration example of a home screen W60 of the multifunction peripheral 50. The home screen W60 differs from the example of the home screen W30 in FIG. 12 in that the mode selection buttons B16 includes an e-mail button B163 and a login user name display area R22 in which the name of the currently logged-in user appears. The e-mail button B163 is a mode selection button that accepts selection of the e-mail mode as one of the modes. Upon accepting input of a selection instruction of the e-mail button B163 by the user, the controller 11 causes a setting screen W70 of the e-mail mode described in the FIG. 21 to be displayed. The login user name display area R22 is a display area for displaying the name of a logged-in user who has succeeded in user authentication. For example, FIG. 20 illustrates an example in which the login user name "User01" is displayed.

Figure 21:
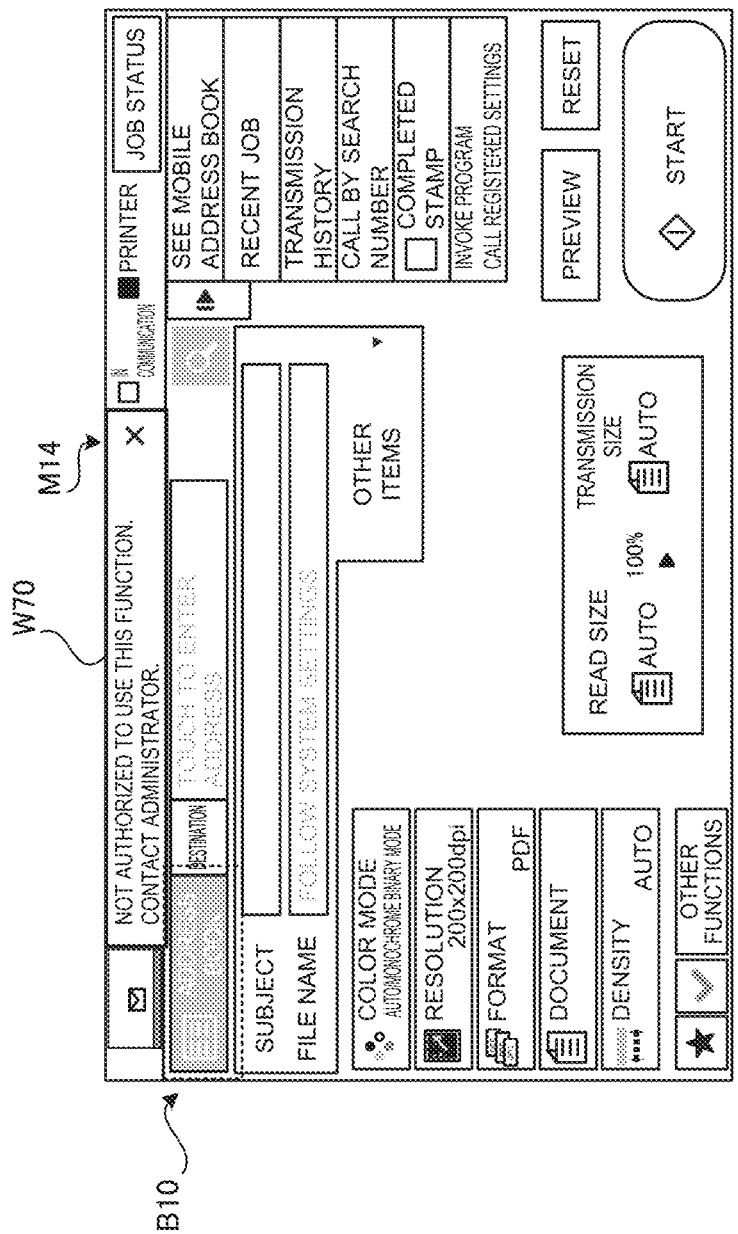
FIG. 21 illustrates an operation example in the third embodiment.

FIG. 21 illustrates a configuration example of the setting screen W70 of the e-mail mode. The setting screen W70 may have substantially the same configuration as that of the setting screen W10 illustrated in FIG. 6. FIG. 21 illustrates an operation example of displaying a message screen M14 indicating that the user is not granted the operation authority of the E-mail mode when the login user selects the address book button B10 that accepts input of the selection of the internal address information as management information.

Figure 22:
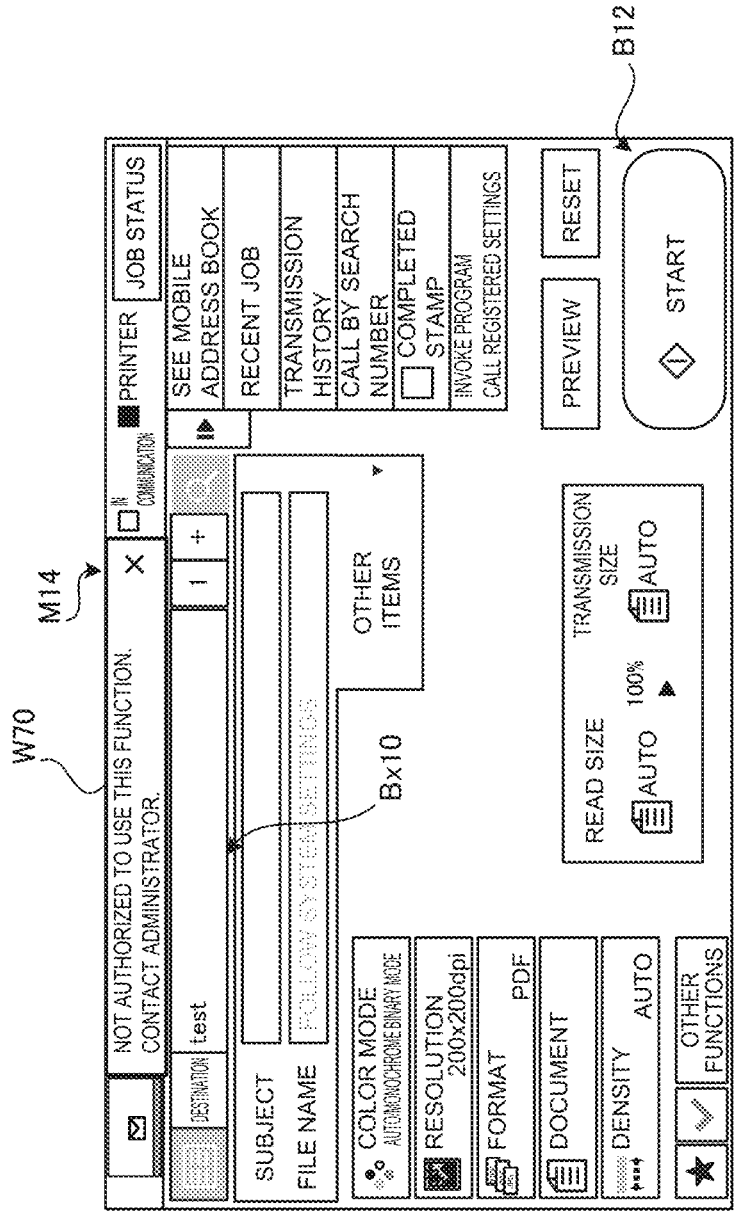
FIG. 22 illustrates an operation example in the third embodiment.

FIG. 22 illustrates an operation example in the case where the login user selects specific destination information "test" from the internal address information as management information and sets it in the destination input box Bx10. In such a case, the message screen M14 is displayed to indicate that the user is not granted the operation authority of the e-mail mode.

Figure 23:
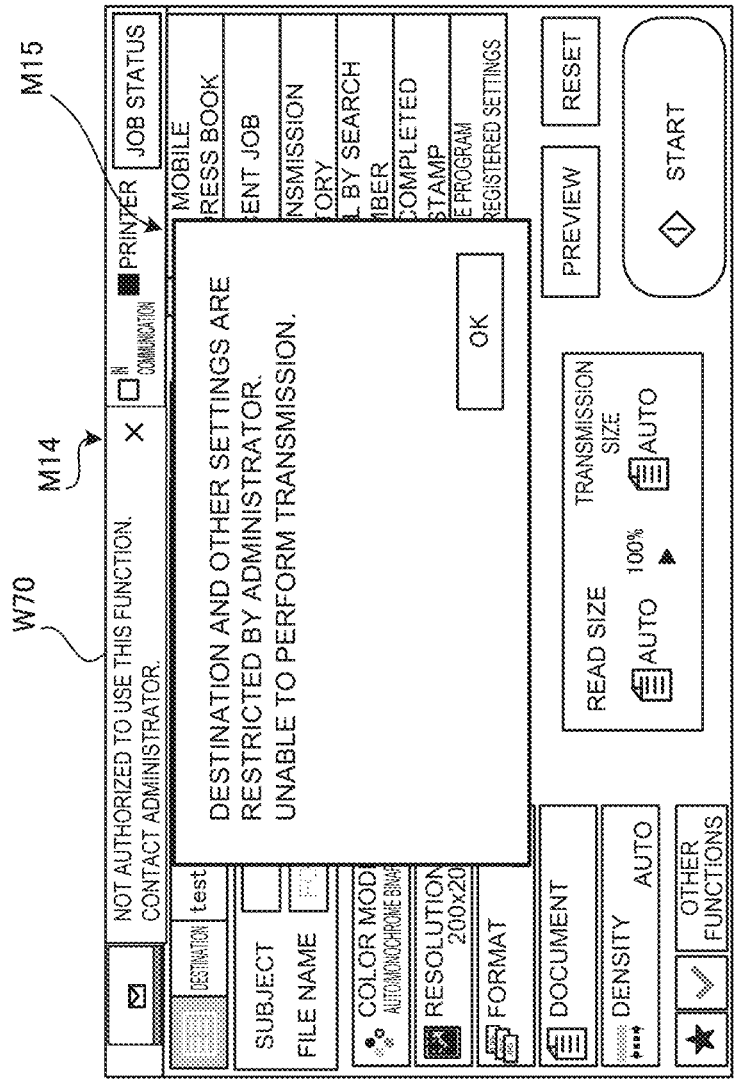
FIG. 23 illustrates an operation example in the third embodiment.

FIG. 23 is a diagram for explaining a message screen M15 displayed by the controller 11 when input of the selection of the start button B12 by the login user is accepted on the setting screen W70 exemplified in FIG. 22. FIG. 23 illustrates an operation example in which a message "Your administrator has restricted the destination and other settings. Unable to perform the transmission." is displayed on the message screen M15 in addition to the message screen M14 illustrated in FIGS. 21 and 22.

In this way, when the login user is not granted the operation authority of the e-mail mode, the transmission of the information based on the e-mail mode is restricted even if the internal address information is selected as management information.

Figure 24:
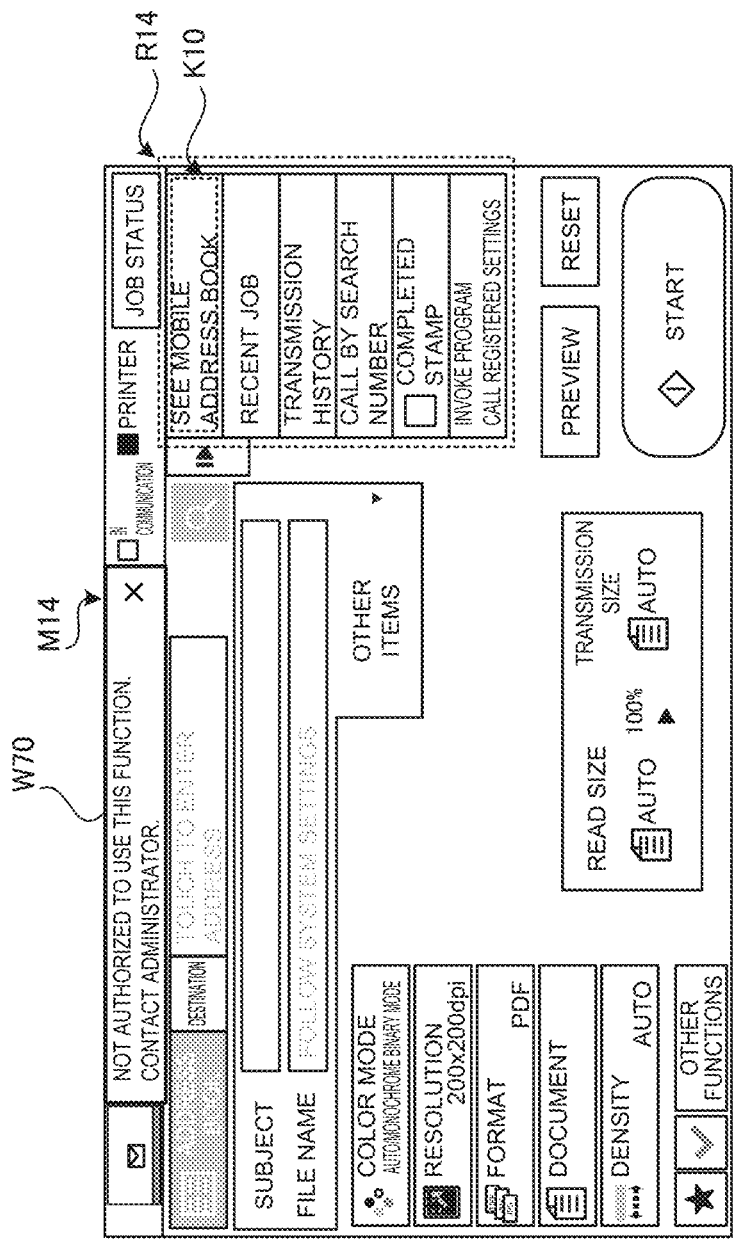
FIG. 24 illustrates an operation example in the third embodiment.

Similarly, FIG. 24 illustrates an operation example of displaying the message screen M14 indicating that the user is not granted the operation authority of the e-mail mode when the login user selects the "see mobile address book" key K10 that accepts input of the selection of the external address information as management information.

Figure 25:
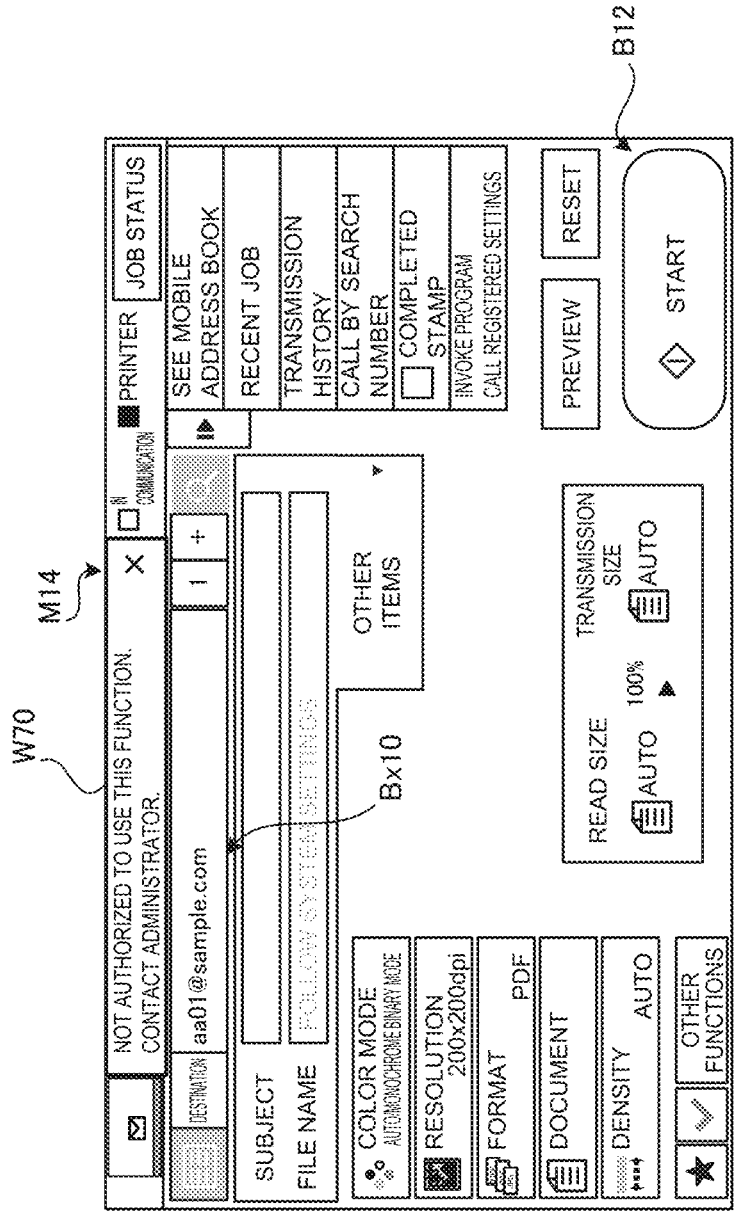
FIG. 25 illustrates an operation example in the third embodiment.

FIG. 25 illustrates an operation example in the case where the login user selects specific destination information "aa01@sample.com" from the external address information as management information and sets it in the destination input box Bx10. In such a case, the message screen M14 is displayed to indicate that the user is not granted the operation authority of the e-mail mode.

Figure 26:
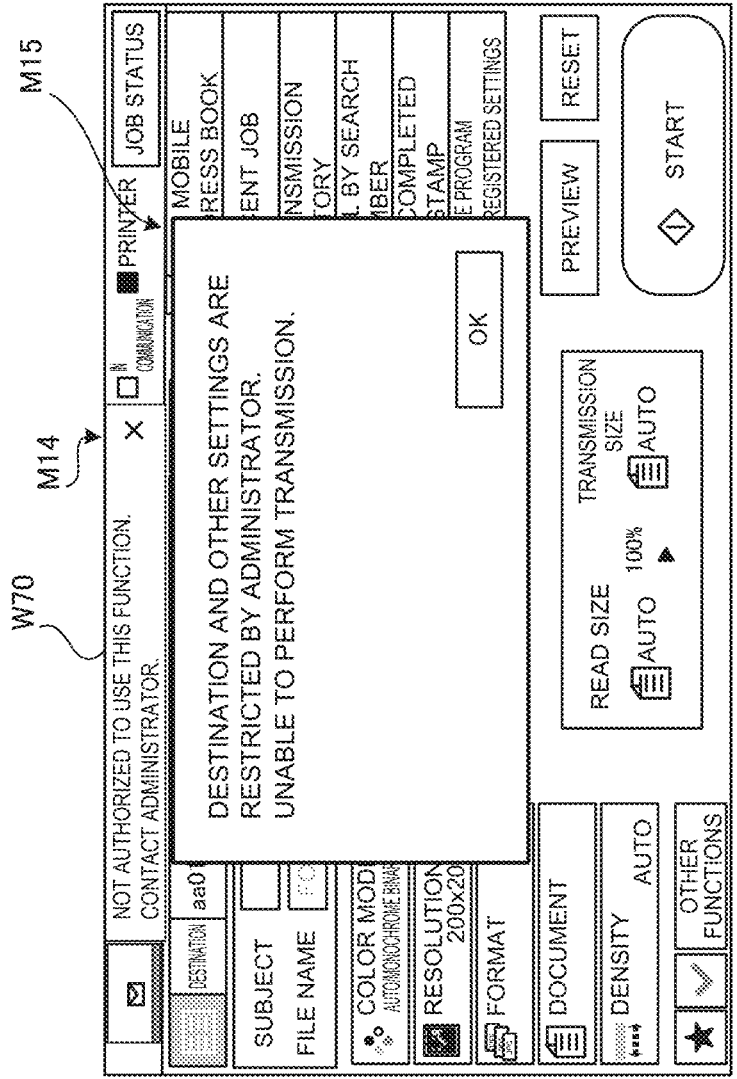
FIG. 26 illustrates an operation example in the third embodiment.

FIG. 26 is a diagram for explaining the message screen M15 displayed by the controller 11 when input of the selection of the start button B12 by the login user is accepted on the setting screen W70 exemplified in FIG. 25. FIG. 26 illustrates an operation example in which a message "Your administrator has restricted the destination and other settings. Unable to perform the transmission." is displayed on the message screen M15 in addition to the message screen M14 illustrated in FIGS. 24 and 25.

Figure 27:
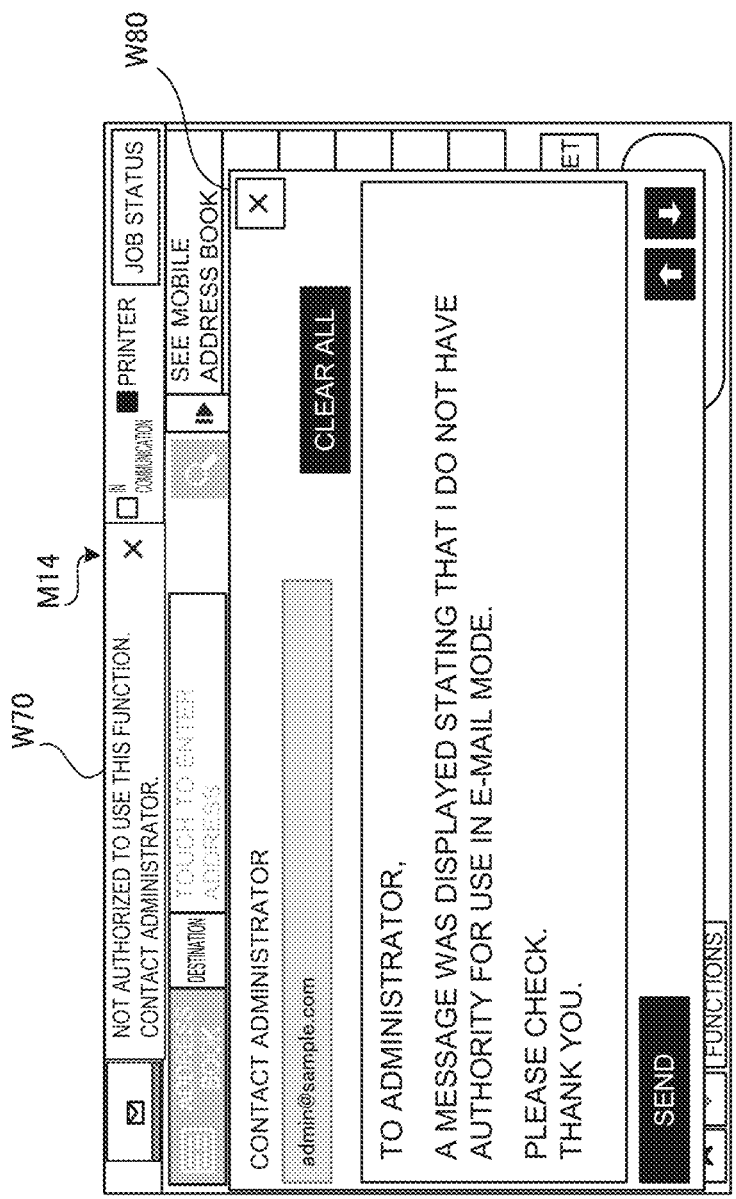
FIG. 27 illustrates an operation example in the third embodiment.

When specific destination information from the external address information is used as management information, for example, in consideration of the convenience of a login user, an e-mail transmission screen W80 that enables the transmission of an E-mail with contents for inquiring the administrator about the restriction on the transmission of information may be displayed, as illustrated in FIG. 27.

In this way, when the login user is not granted the operation authority of the e-mail mode, the transmission of the information based on the e-mail mode is restricted even if the external address information is selected as management information.

As described above, in the third embodiment, the transmission and reception of information via the communicator is restricted on the basis of the authority determination result of whether or not operation authority in the fax mode, the e-mail mode, or the like is granted to an authenticated user. The administrator of the multifunction peripheral can control whether or not to authorize the owner of the terminal device that manages the external address information, and this also ensures security.

The present disclosure is not limited to the embodiments described above, and various modifications can be made. That is, the present disclosure also includes an embodiment to be obtained by combining technical means modified as appropriate without departing from the spirit of the present disclosure.

Although the embodiments described above have been described separately for convenience of explanation, it is indeed possible to combine and implement the embodiments within the technically possible range.

The program operating in each apparatus according to the embodiment is a program that controls the CPU and the like (a program that causes the computer to function) so as to perform the functions according to the above-described embodiments. The information handled by the devices is temporarily stored in a temporary storage device (for example, a RAM) during processing of the information, and then is stored in various read only memories (ROMs), an HDD, or the like, and is read, modified, and written by the CPU as necessary.

The recording medium that stores a program may be any one of a semiconductor medium (for example, a ROM, a non-volatile memory card, or the like), an optical recording medium or a magnetooptical recording medium (for example, a digital versatile disc (DVD), a magnetooptical disc (MO), a mini disc (MD), a compact disc (CD), a Blu-ray (registered trademark) disc (BD), or the like), and a magnetic recording medium (for example, a magnetic tape, a flexible disk, or the like). The functions of the present disclosure may also be implemented not only by executing the loaded programs, but also by processing in cooperation with the operating system, other application programs, or the like in accordance with the instructions of the programs.

When it is desired to distribute in the market, the programs may be stored in a portable recording medium for distribution or transferred to a server computer connected via a network such as the Internet. In such a case, a storage device of the server computer is indeed included in the present disclosure.

What is claimed is:

1. A processing device comprising:
a communicator that transmits and receives information by using management information;
a memory that stores computer-readable instructions; and
one or more controllers that restrict the transmission and reception of the information via the communicator by executing the computer-readable instructions stored in the memory,
wherein, when the management information comprises management information acquired from a terminal device, the one or more controllers determine whether an authorization regarding the transmission and reception of the information is granted to an authenticated user, and
when the one or more controllers determine that the authorization regarding the transmission and reception of the information is granted to the authenticated user, the one or more controllers cancel the restriction on the transmission and reception of the information via the communicator by outputting a cancel command to the communicator.

2. The processing device according to claim 1, wherein:
the one or more controllers restrict the transmission and reception of the information based on a restriction setting,
the one or more controllers cancel the restriction setting when the restriction on the transmission and reception of the information is canceled, and
when the management information comprises internally managed information, the one or more controllers maintain the restriction setting.

3. The processing device according to claim 1, wherein the management information comprises destination information.

4. The processing device according to claim 3, wherein:
the one or more controllers restrict the transmission and reception of the information based on a restriction setting,
the one or more controllers cancel the restriction setting when the restriction on the transmission and reception of the information is canceled, and
the restriction setting comprises prohibition of selecting the destination information or prohibition of directly designating the destination information.

5. The processing device according to claim 1, wherein:
the one or more controllers restrict the transmission and reception of the information based on a restriction setting,
the one or more controllers cancel the restriction setting when the restriction on the transmission and reception of the information is canceled, and
when an acquisition request is made to the terminal device for acquiring the management information and when the restriction setting is a restriction setting regarding a restriction on a communication connection, the one or more controllers cancel the restriction setting and acquire the management information from the terminal device.

6. An image processing apparatus comprising:
the processing device according to claim 1; and
an image processor.

7. A processing method comprising:
transmitting and receiving information by using management information; and
restricting the transmission and reception of the information,
wherein, when the management information comprises management information acquired from a terminal device, determining whether an authorization regarding the transmission and reception of the information is granted to an authenticated user, and
when determining that the authorization regarding the transmission and reception of the information is granted to the authenticated user, cancelling the restriction on the transmission and reception of the information by outputting a cancel command.

* * * * *